United States Patent [19]
Konagaya et al.

[11] Patent Number: 6,000,824
[45] Date of Patent: Dec. 14, 1999

[54] VEHICULAR MARKER LAMP

[75] Inventors: Nobusuke Konagaya; Hiroshi Yamamoto, both of Shizuoka, Japan

[73] Assignee: Koito Manufacturing Co., Ltd., Tokyo, Japan

[21] Appl. No.: 08/689,049

[22] Filed: Jul. 30, 1996

[30] Foreign Application Priority Data

Aug. 3, 1995 [JP] Japan .................................. 7-216551
Dec. 22, 1995 [JP] Japan .................................. 7-349555

[51] Int. Cl.$^6$ ........................................... B60Q 1/26
[52] U.S. Cl. ........................... 362/549; 362/457; 362/541
[58] Field of Search .................................. 362/541, 546, 362/548, 549, 154, 368, 374, 375, 457

[56] References Cited

U.S. PATENT DOCUMENTS

| | | | |
|---|---|---|---|
| 3,991,905 | 11/1976 | Nicpon | 362/375 |
| 4,945,456 | 7/1990 | Kakidaira | 362/80.1 |
| 5,278,745 | 1/1994 | Kelly et al. | 362/374 |
| 5,510,968 | 4/1996 | Pokriefka et al. | 362/368 |
| 5,560,701 | 10/1996 | Payne | 362/83.3 |
| 5,765,942 | 6/1998 | Shirai et al. | 362/374 |

*Primary Examiner*—Y. Quach
*Attorney, Agent, or Firm*—Morgan, Lewis & Bockius LLP

[57] ABSTRACT

The vehicular marker lamp constituted by integrally molding a lamp base body to which a light source is installed, a lens member coupled to a front end part of the lamp base body for controlling illumination light beam emitting from the light source and an integral hinge connecting the lens member to the lamp base body, using a mold material which is capable of forming lenses.

20 Claims, 23 Drawing Sheets

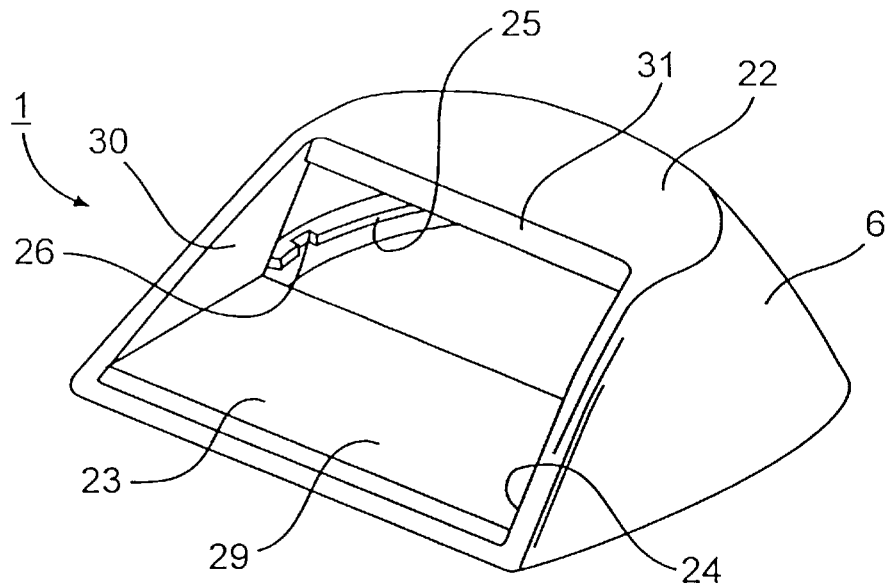
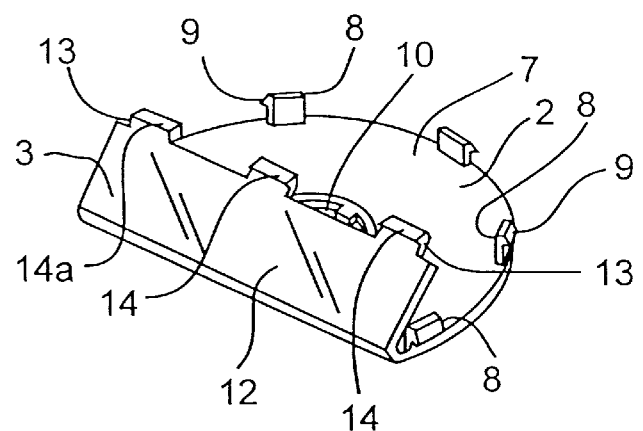
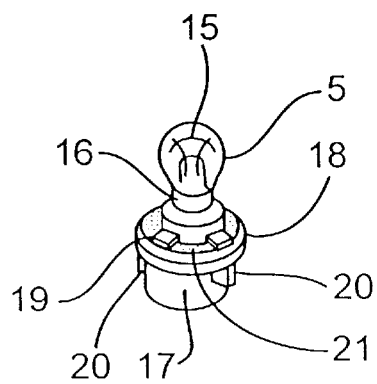
FIG. 2

VEHICULAR MARKER LAMP

BACKGROUND OF THE INVENTION

The present invention relates generally to a vehicular marker lamp. More particularly, the invention relates to a vehicular marker lamp with which components are reduced in number and the workability during assembly is improved.

RELATED ART

FIG. 26 is an exploded perspective view showing a high-mount stop lamp placed inside a rear wind shield of an automobile for enhancing visibility of a mark of stopping the automobile, which is one example of a conventional vehicular marker lamp. FIG. 27 is a sectional view of the conventional high-mount stop lamp shown in FIG. 26.

As shown in the figures, high-mount stop lamp a is constituted by a lamp body b, a lens member c and a lamp bulb e set within a lamp chamber d defined by the lamp body b and the lens member c, and a cover body f which houses within the lamp body b. The lamp body b is provided with an opening directing frontward (beam illumination direction of the high-mount stop lamp a is referred here as frontward), a bulb mounting hole g formed in a bottom wall at substantially a center thereof, and rectangular engaging holes h formed in an upper wall and the bottom wall at the front end side thereof.

The lens member c is shaped like a shallow vessel and has an opening directing rearward. The lens member c is formed with engaging pieces i laterally spaced from each other projecting rearward from an upper and bottom walls thereof. An engaging pawl j is formed at a rear end part of each of the engaging piece i. The cover body f has a hood member k extending laterally which is formed integrally therewith except for a front-lower end part thereof.

The high-mount stop lamp a is assembled by positioning correctly and coupling lens member c to the opening of the lamp body b, connecting the engaging pawls i of the lens member c with the engaging holes h formed on the upper and bottom walls of the lamp body b, so that the opening of the lamp body b is closed by the lens member c to define the lamp chamber d. Then, the lamp bulb e is mounted to the bulb mounting hole g of the lamp body b through a socket 1 to place the lamp bulb e within the lamp chamber d defined by the lamp body b and the lens member c. Afterwards, the lamp body b is attached to the inside the cover body f by an appropriate means in such a manner that the lamp body b is hung on the cover body f.

The conventional high-mount stop lamp a as disclosed above suffers from a problem that it requires many components because the lens member c and the lamp body b are separately provided.

Further, the lens member c is coupled to the lamp body b by positioning accurately and then depressing the lens member c into the opening of the lamp body b while keeping still the lens member c which is accurately positioned. However, because there is provided no guide member or the like from the lens member c to the lamp body b, it is not easy to keep the lens member c in the accurately positioned state. In a case where the lens member c is not accurately held, the lens member c would not be smoothly fitted in the opening of the lamp body b as the outer peripheral surfaces of the lens member c would be obstructed to move by the inner peripheral surfaces of the lamp body b.

SUMMARY OF THE INVENTION

The present invention was made in view of the foregoing problems or difficulties accompanying the conventional vehicular marker lamp. Accordingly, an object of the present invention is to provide a marker lamp capable of improving the workability during assembly. Another object of the invention is to provide a marker lamp capable of reducing the number of components.

The above and other objects can be achieved by a provision of a marker lamp in which a lamp base body and a lens member arc integrally coupled to each other by an integral hinge.

More specifically, the vehicular marker lamp according to the present invention is constituted by integrally molding a lamp base body to which a light source is installed, a lens member coupled to a front end part of the lamp base body for controlling illumination light beam emitting from the light source and an integral hinge connecting the lens member to the lamp base body, using a mold material which is capable of forming lenses.

According to another aspect of the invention, the vehicular marker lamp is constituted by integrally molding a lamp base body to which a light source is installed, a reflector member subjected to reflection treatment and formed integrally with the lamp base body for controlling the illumination light beam emitting from the light source, a lens member coupled to a front end part of the lamp base body for controlling illumination light beam reflected by the reflector member, and an integral hinge connecting the lens member to the lamp base body, using a mold material which is capable of forming lenses.

According to the vehicular marker lamp of the present invention, since the lamp base body and the lens member are integrally connected to each other by the integral hinge to provide a single unit, the number of components can be reduced.

Therefore, since the lens member can be accurately positioned with respect to the lamp base body merely by bending the lens member at the integral hinge, the workability during the assembly of the marker lamp can be simplified.

BRIEF DESCRIPTION OF THE DRAWINGS

FIG. 2 is an exploded perspective view of the marker lamp shown in FIG. 1;

DESCRIPTION OF THE PREFERRED EMBODIMENTS

Preferred embodiments of the present invention will now be described with reference to accompanying drawings.

Figure 1:
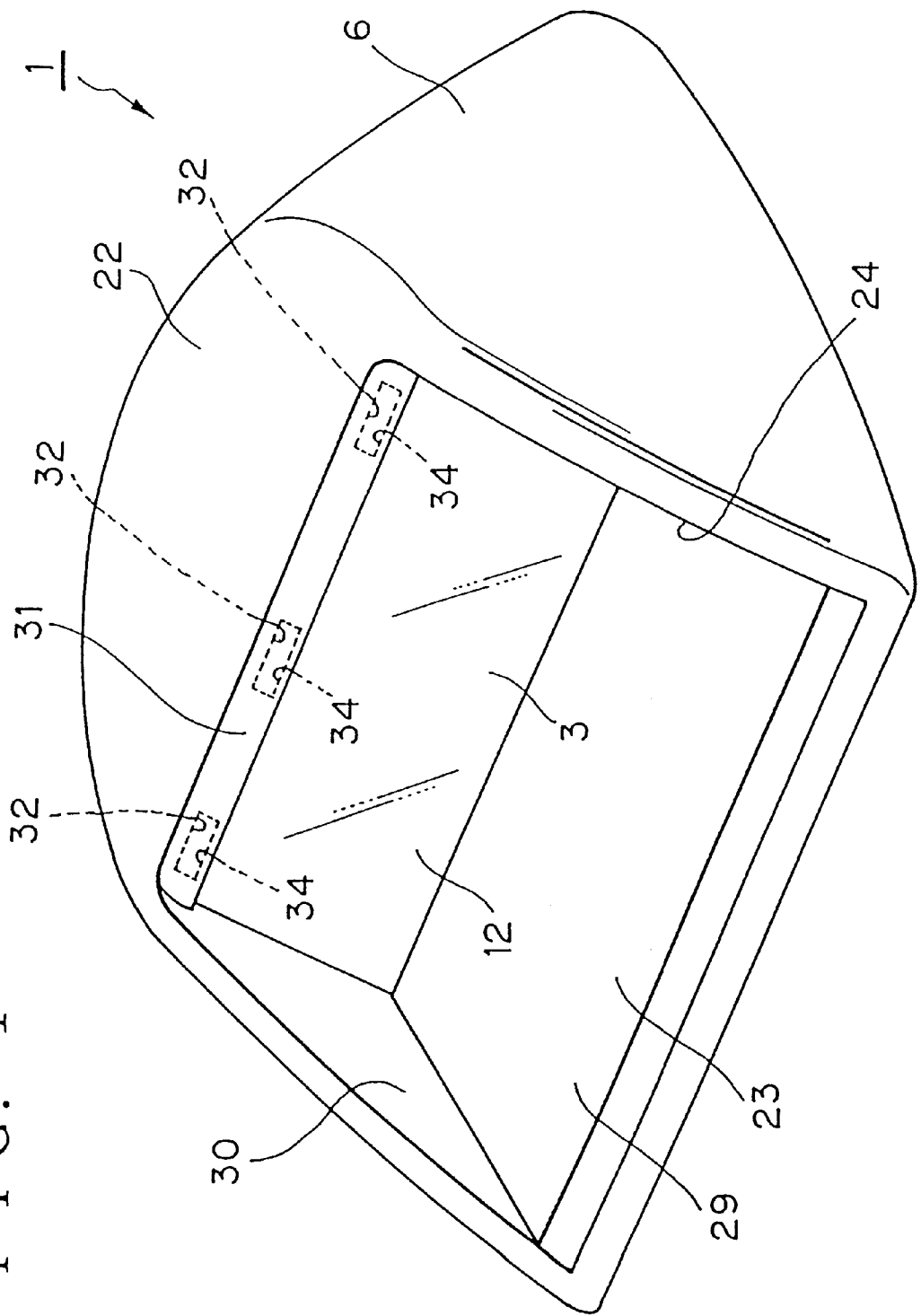
FIG. 1 is a schematic perspective view showing a vehicular marker lamp according to a first embodiment of the present invention.
Figure 3:
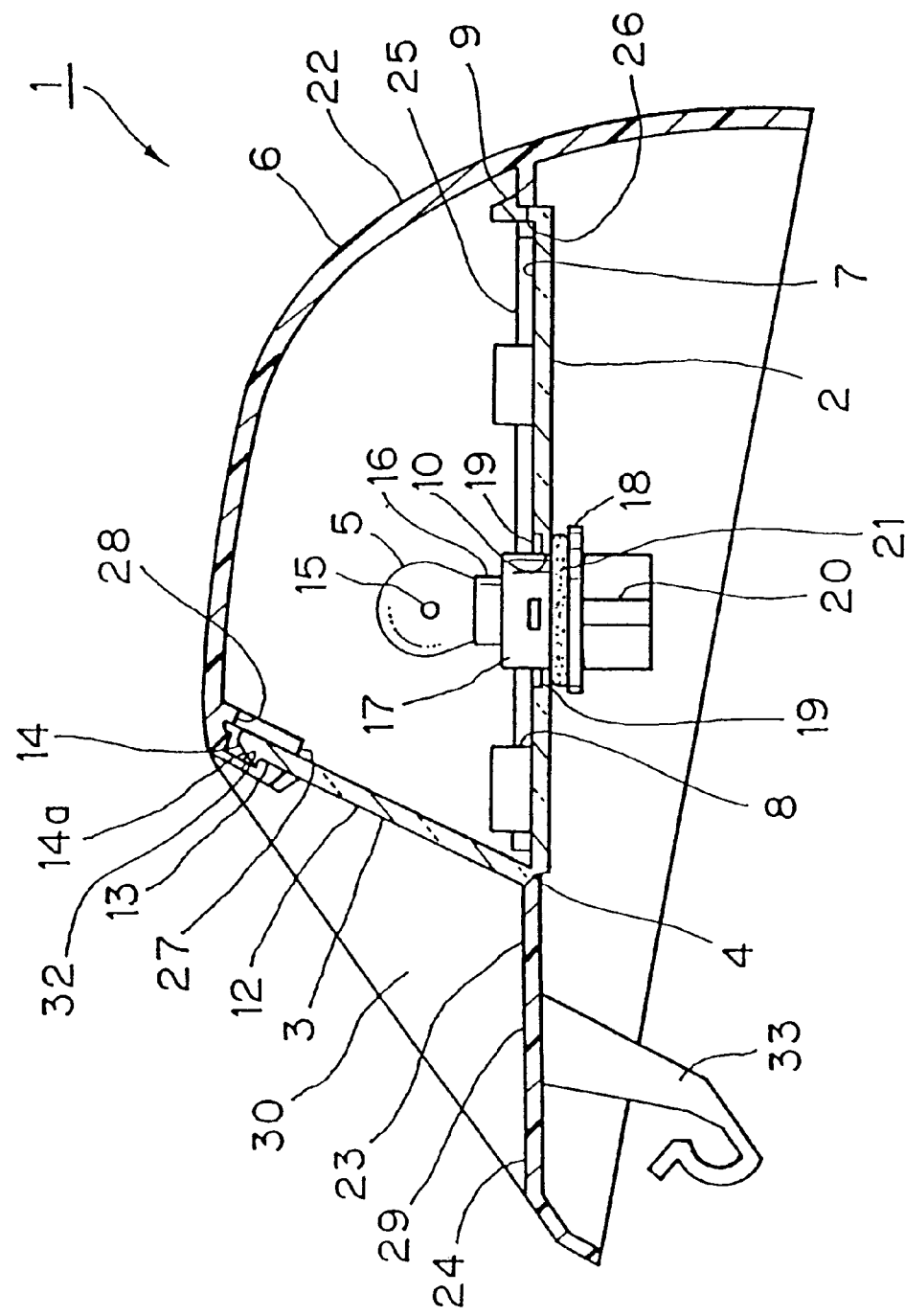
FIG. 3 is a sectional view of the marker lamp shown in FIG. 1.
Figure 4:
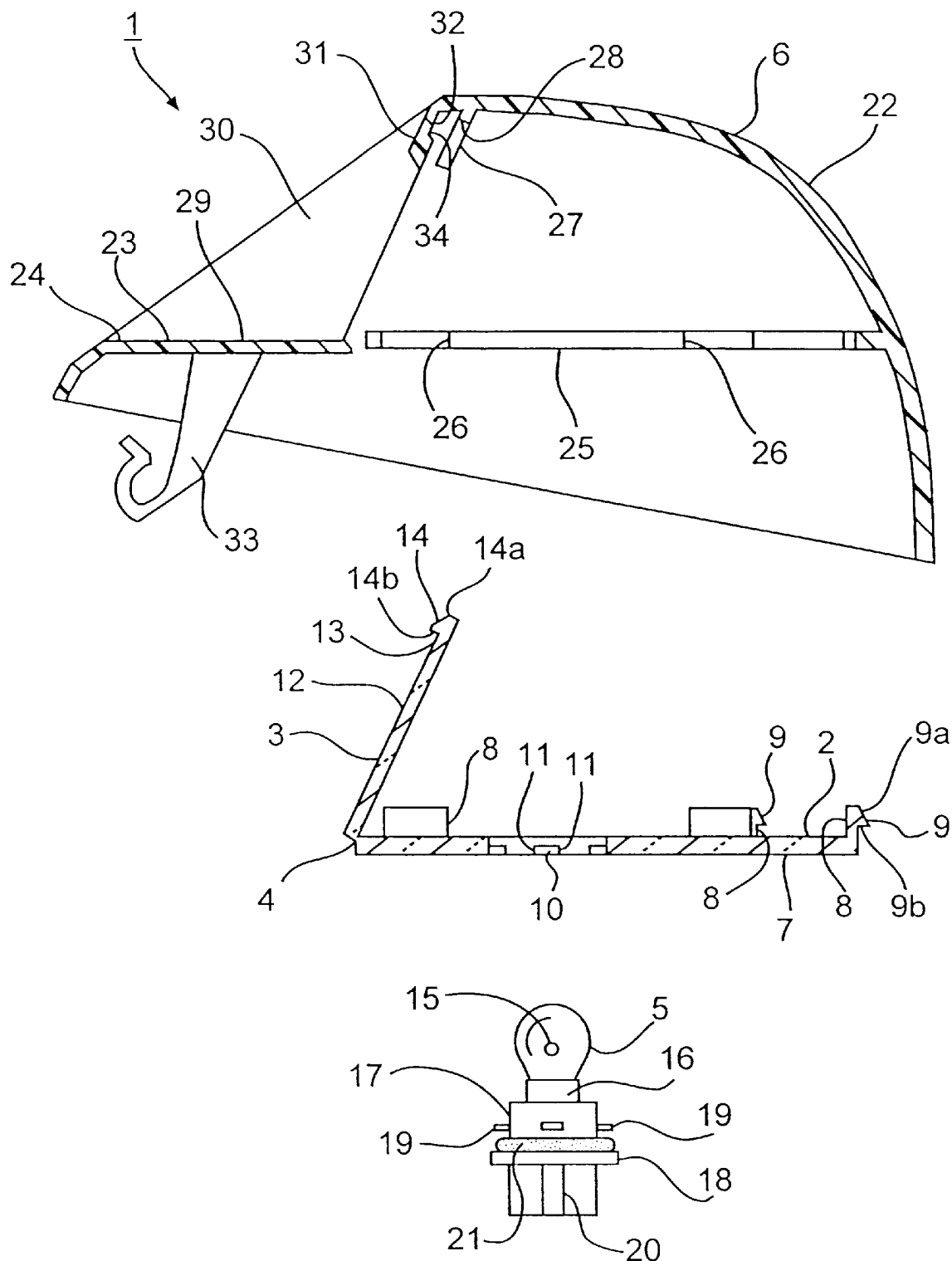
FIG. 4 is an exploded sectional view of the marker lamp shown in FIG. 1.
Figure 5:
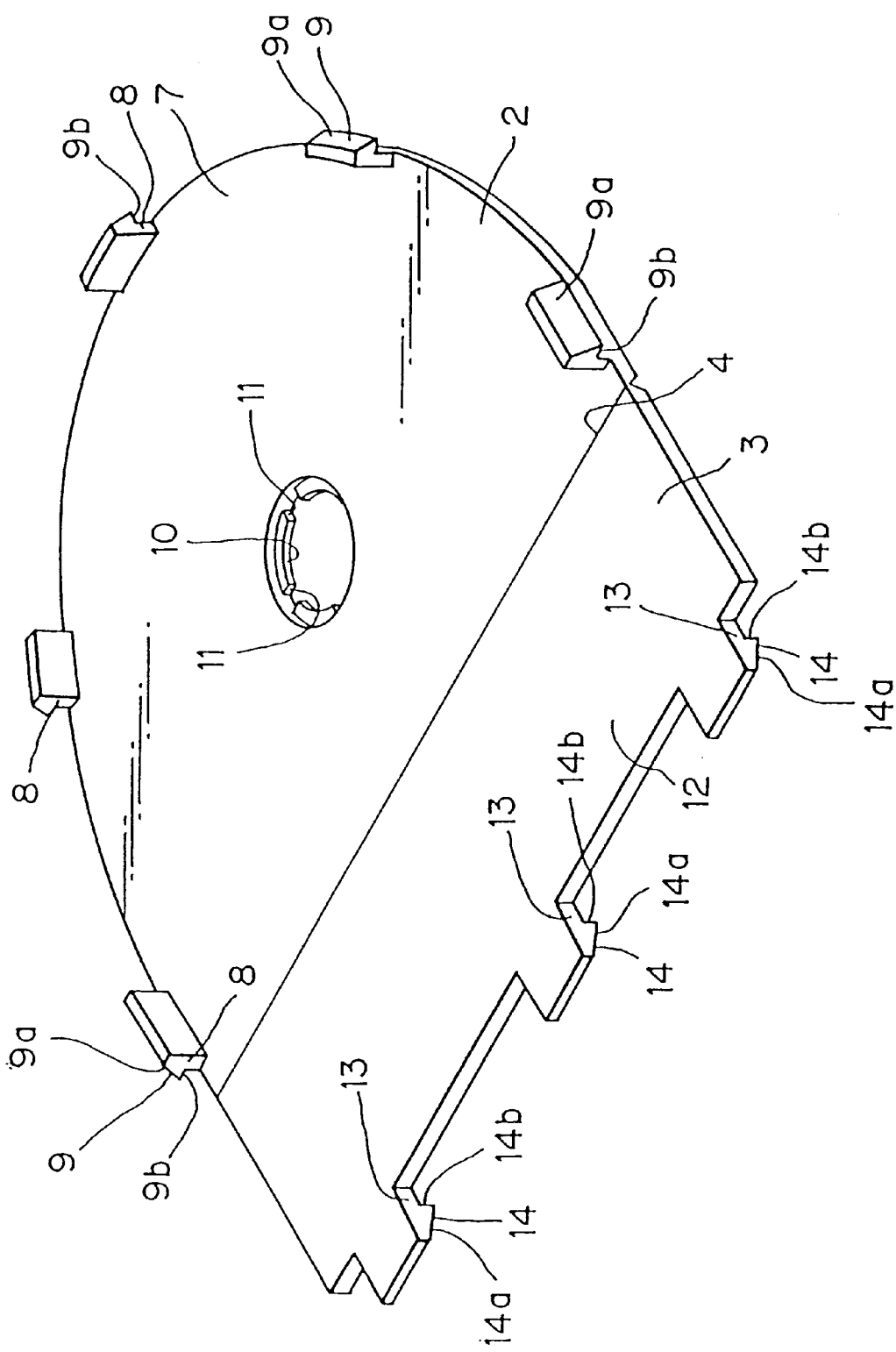
FIG. 5 is a perspective view showing a lamp base body and a lens member according to the first embodiment of the invention.
Figure 6:
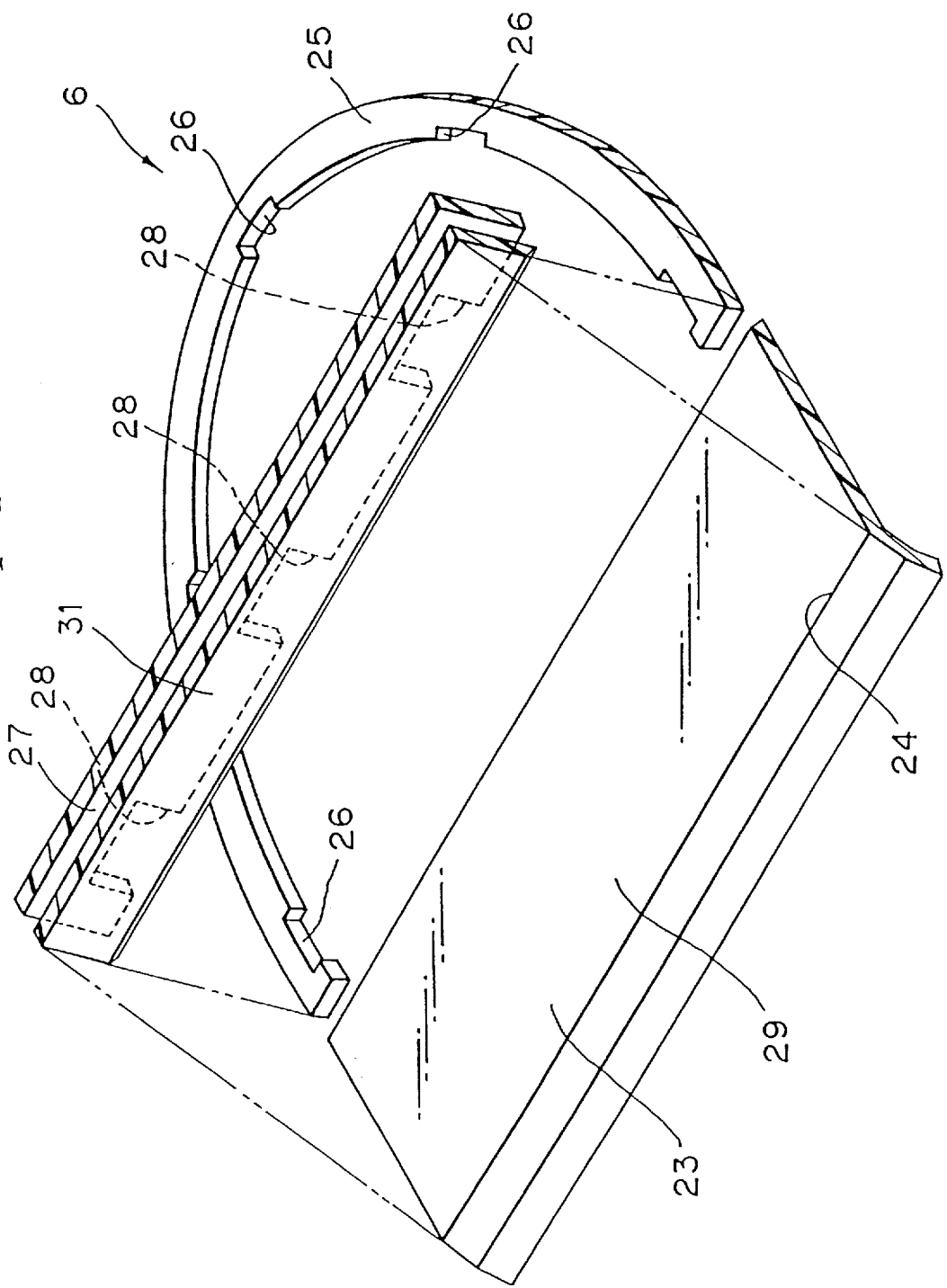
FIG. 6 is a perspective view which is partly cut-out for viewing the inside of a cover body.

FIGS. 1 through 6 show a vehicular marker lamp according to a first embodiment of the present invention. Specifically, FIG. 1 is a schematic perspective view showing a vehicular marker lamp according to a first embodiment of the present invention, FIG. 2 is an exploded perspective view of the marker lamp shown in FIG. 1, FIG. 3 is a sectional view of the marker lamp shown in FIG. 1, FIG. 4 is an exploded sectional view of the marker lamp shown in FIG. 1, FIG. 5 is a perspective view showing a lamp base body and a lens member according to the first embodiment of the invention, and FIG. 6 is a perspective view which is partly cut-out for viewing the inside of a cover body.

In the first embodiment, the present invention is applied to a high-mount stop lamp placed inside a rear wind shield of an automobile for enhancing visibility of a mark of stopping the automobile.

A high-mount stop lamp 1 is constituted by a lamp base body 2, a lens member 3 disposed at a front end part of the lamp base body 2 (hereinafter an upward direction, a downward direction, a leftward direction and a rightward direction of FIG. 3 are referred as an upward direction, a downward direction, a frontward direction and a rearward direction, respectively), an integral hinge 4 connecting the lens member 3 to the lamp base body 2, a lamp bulb 5 installed at substantially a center of the lamp base body 2, and a cover body 6 housing therein the lamp base body 2.

The lamp base body 2, the lens member 3 and the integral hinge 4 are integrally molded with a transparent or colored transparent material which is capable of forming lenses. Since the lamp base body 2 is formed from the transparent material and accordingly illumination light beam emitting from the lamp bulb 5 transmits downward through the lamp base body 2, the undesirable increase of the temperature within the lamp chamber is suppressed compared with a case where an opaque material is used.

As shown in FIGS. 2, 4 and 5, the lamp base body 2 is provided with a main section 7 which is a semi-circular platelike member, engaging protrusions 8 projecting upward from a side and rear peripheral parts of the main section 7, and engaging pawls 9 projecting outward from an upper end part of each of the engaging protrusions 8.

The lamp base body 2 is formed at a substantially center thereof with a circular bulb mounting hole 10 a periphery of which is provided with insertion notches 11 disposed symmetrically.

The lens member 3 is constituted integrally by a substantially rectangular plate-like main section 12, engaging protrusions 13 projecting upward from an upper edge of the main section 12 and engaging pawls 14 projecting frontward from an upper end part of the engaging protrusions. Though not shown in the figures, the lens member 3 is formed with fish-eye lens member steps, Fresnel lens member steps or the like on a front and a rear surfaces thereof.

The integral hinge 4 is molded in such a manner that a thickness of which is slightly thinner than that of the lamp base body 2 and the lens member 3. The integral hinge 4 connects a front edge part of the lamp base body 2 and a lower edge part of the lens member 3, so that the lamp base body 2 is integrally formed with the lens member 3 through the integral hinge 4.

The lamp bulb 5 has a filament 15 installed within a glass ball and a metal piece 16 which is detachably coupled to the socket 17. The socket 17, which is substantially cylindrical, is provided with a flange 18 projecting from a substantially center in the up-down direction of an outer peripheral surface of the socket, engaging pieces 19 projecting symmetrically from the outer surface which is slightly upper than the flange 18. A couple of operation pieces 20 project opposite to each other from the outer surface of the socket 17 at a position lower than the flange 18. The operation pieces 20 extend in the axial direction of the socket 17 and connect continuously to a lower surface of the flange 18.

An O-ring 21 formed from a rubber material is mounted on the socket 17 above the flange 18.

The cover body 6 is constituted by a main body 22 and a hood section 23. The main body 22, which is generally cup-shaped turned up side down, is provided with a laterally elongated opening 24 at a front portion except for a lower end part thereof. The hood section 23 is laterally elongated and generally triangular in cross section. A front edge part of the hood section 23 integrally, continuously connects to an opening edge part of the front opening 24 of the main body 22.

As shown in FIGS. 2, 3 and 6, the cover body 6 is formed on an inner surface of the side and rear walls thereof at a substantially center in the up-down direction with an attaching piece 25 constituted by a horseshoe-shaped thin plate looking in the up-down direction. Engaging notches 26 are formed in the attaching piece 25. A pressing plate 27 extends along a slightly front side of a flat portion of an upper inner surface of the cover body 6. Insertion notches 28 are formed in a lower end part of the pressing plate 27.

The hood section 23 of the cover body 6 is constituted by a bottom plate 29 which is generally trapezoidal viewing in the up-down direction, generally triangular side plates 30 rising from both left and right side edges of the bottom plate 29, and a web-like upper edge section 31 connecting between upper portions of the left and right side plates 30.

As best shown in FIGS. 1, 3 and 4, rectangular engaging holes 32 are formed in a rear surface of the upper edge section 31 of the hood section 23. The engaging holes 32 of the hood section 23 are aligned in the front-rear direction with the insertion notches 28 of the pressing plate 27. As shown in FIGS. 3 and 4, retaining arms 33 (merely one arm is shown in the figures) extends from a lower surface of the bottom plate 29 of the hood section 23 at a position closed to the left-right side edges of the bottom plate 29.

During assembly, after the lamp bulb 5 is inserted from the bottom into the bulb mounting hole 10 formed in the main section 7 of the lamp base body 2 at a substantially center thereof, the engaging pieces 19 of the socket 17 on which the lamp bulb 5 is detachably supported is inserted in the insertion notches 11 formed in the bulb mounting hole 10, while grasping the operation pieces 20 formed on the lower position of the outer surface of the socket 17 and urging the O-ring 21 mounted on the outer peripheral surface of the socket 17 against the lower surface of the main section 7 of the lamp base body 2, the socket is rotated in the circumferential direction thereof so that the opening edge part of the bulb mounting hole 10 is held by the engaging pieces 19 and the flange 18, thereby to mount the socket 17 to the bulb mounting hole 10.

Afterwards, the lens member 3 is bent upward along the integral hinge 4 and an upper end of the lens member 3 is inserted into a gap defined by the upper edge section 31 of the hood section 23 and pressing plate 27 formed on the cover body 6. In this operation, inclined surfaces 14a of the engaging pawls 14 projecting from the engaging protrusions 13 of the lens member 3 come into abutment against a lower corner edge of the upper edge section 31 of the hood section 23 so that the engaging protrusions 13 of the lens member 3 are deformed to bend rearward. Then, when the lens member 3 further moves upward and bottom surfaces 34 of the engaging holes 32 formed in the upper edge section 31 of the hood section 23 fitted to connection surfaces 14b of the engaging pawls 14 projecting from the engaging protrusions 13 of the lens member 3, the bending of the engaging protrusions 13 returns to the original condition so that the connection surfaces 14b of the engaging pawls 14 engage with the bottom surfaces 34 of the engaging holes 32 formed in the upper edge section 31 of the hood section 23. Therefore, the engaging protrusions 13 of the lens member 3 fit in the gap defined by the upper edge section 31 of the hood section 23 and the pressing plate 27 of the cover body 6 and, at the same time, the lower end part of the lens member 3 is disposed on the rear end part of the bottom plate 29 of the hood section 23.

During the foregoing assembly, when the engaging protrusions 13 projecting from the lens member 3 engage with the cover body 6, since the gap defined between the upper edge section 31 of the hood section 23 and the pressing plate 27 of the cover body 6 is dimensioned slightly larger than the thickness of the engaging protrusions 13 of the lens member 3, it may concern that the engaging protrusions 13 of the lens member 3, which are bent rearward, cannot fit in the upper edge section 31 of the hood section 23 and the pressing plate 27 of the cover body 6. However, according to the present invention, since the insertion notches 28 are formed in the pressing plate 27, the engaging protrusions 13 would not interfere with the pressing plate 27 because the engaging protrusions 13 come into insertion in the insertion notches 28 when the engaging protrusions 13 are bent rearward.

On the other hand, at the same time when the engaging protrusions 13 of the lens member 3 engage with the upper edge section 31 of the hood section 23, the engaging protrusions 8 formed on the lamp base body 2 come into contact with the engaging notches 26 of the attaching piece 25 formed on the inner surface of the cover body 6. Then, by further moving the lamp base body 2 upward, inclined surfaces 9a of the engaging pawls 9 formed on the engaging protrusions 8 of the lamp base body 2 come into contact to the lower end part of the engaging notches 26 formed in the attaching piece 25 of the cover body 6 to thereby flex inward the engaging protrusions 8 of the lamp base body 2. When the lamp base body further moves upward, the surfaces directing upward of the attaching piece 25 of the cover body 6 come to fit to attaching surfaces 9b directing downward of the engaging pawls 9 of the lamp base body 2. At this time, the bending of the engaging protrusions 8 of the lamp base body 2 returns to its original state, and the engaging protrusions 8 come into engagement with the engaging notches 26 of the attaching piece 25 formed on the inner surface of the cover body 6. At the same time, the attaching surfaces 9b of the engaging pawls 9 come into engagement with the attaching piece 25 of the cover body 6, so that the lamp base body 2 engages with the cover body 6.

The high-mount stop lamp 1 assembled as described above is mounted on a rear tray of the vehicle body (not shown), and the retaining arms 33 extending from the hood section 23 engage with the vehicle body so that the high-mount stop lamp 1 is secured to the vehicle body.

Figure 7:
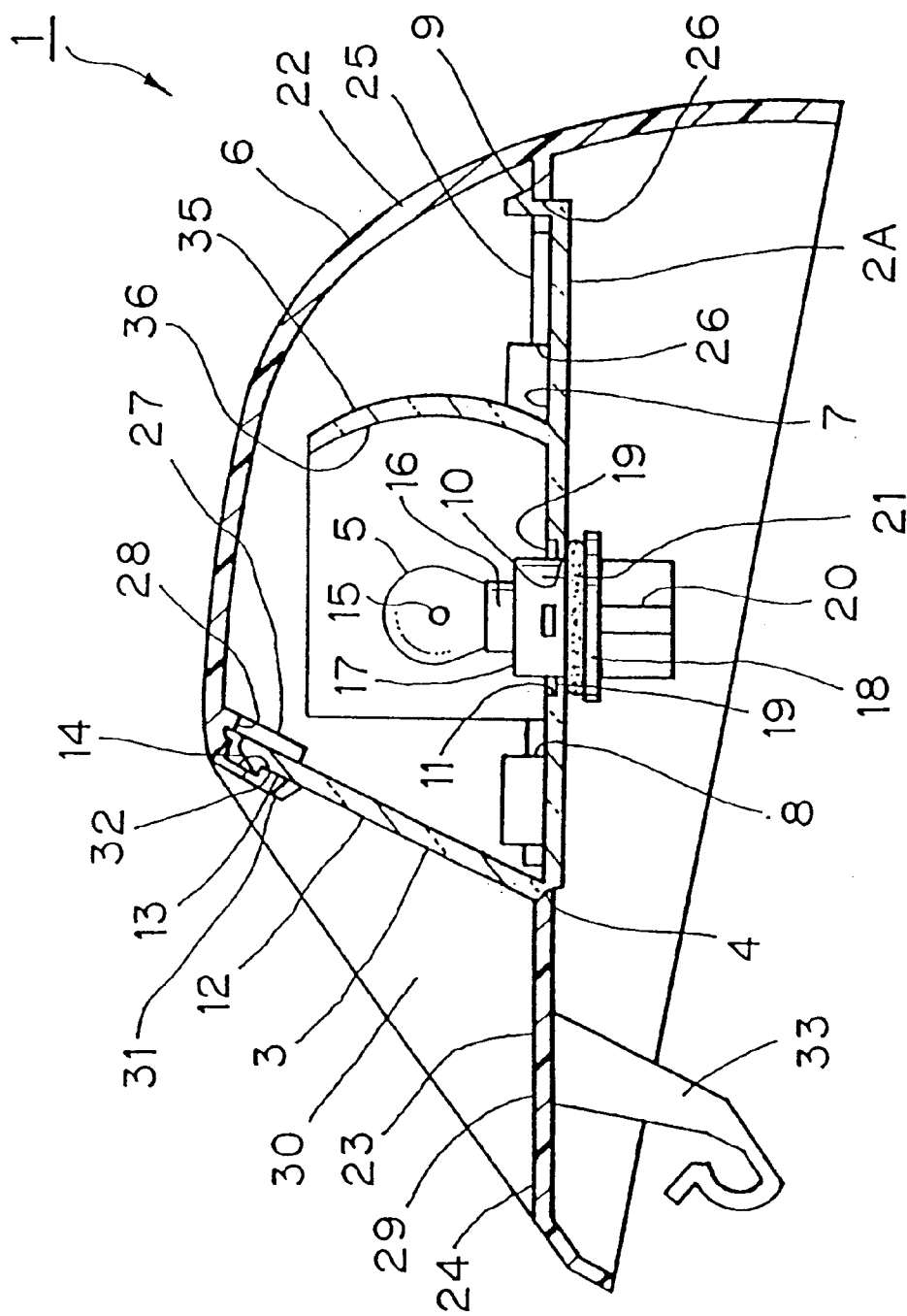
FIG. 7 is a sectional view showing a modification of a marker lamp according to the present invention.
Figure 8:
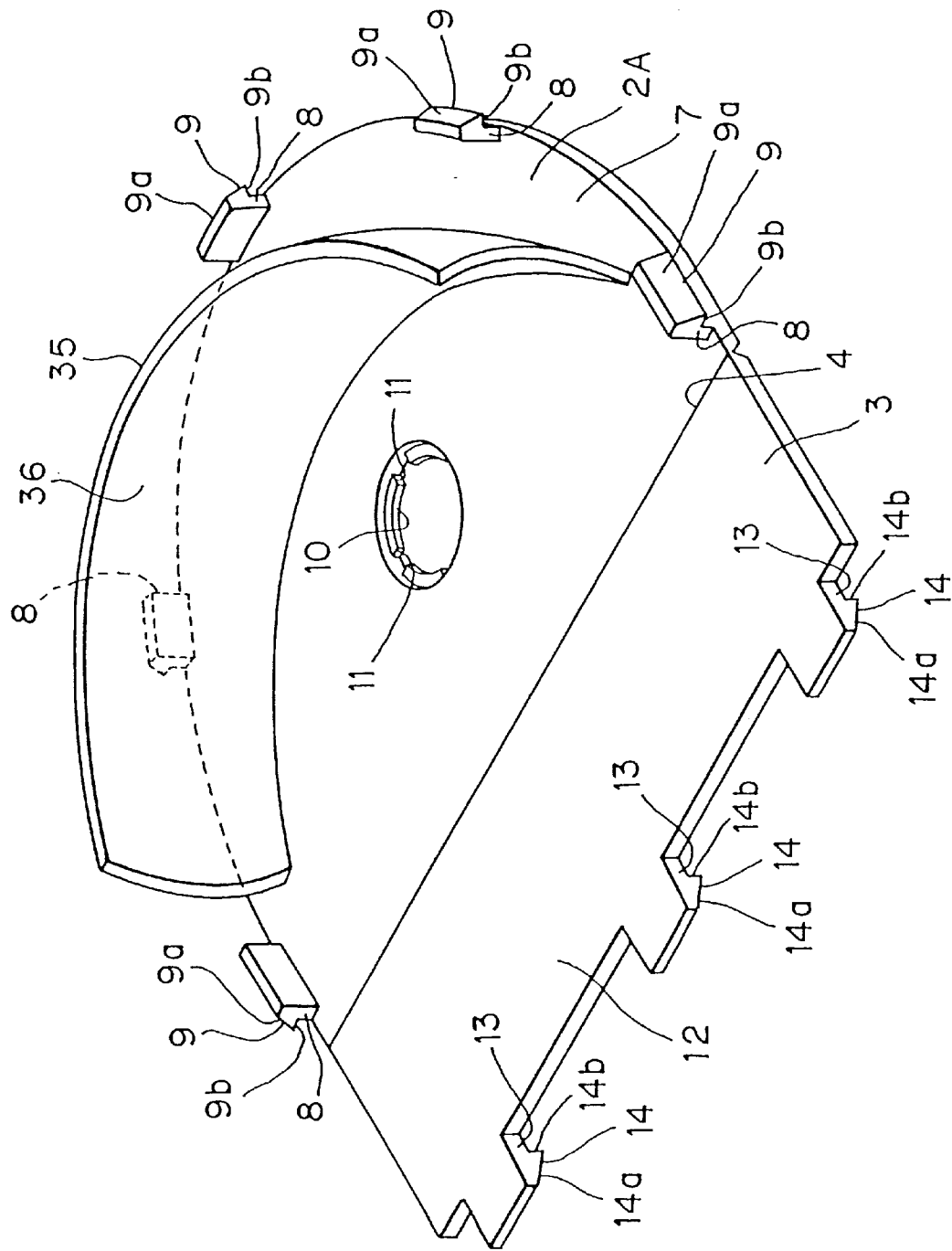
FIG. 8 is a perspective view showing a lamp base body and a lens member of the modified marker lamp shown in FIG. 7.

FIGS. 7 and 8 show a modification of the lamp base body 2 according to the present invention. More specifically, FIG. 7 is a sectional view showing a modification of a marker lamp according to the present invention, and FIG. 8 is a perspective view showing a lamp base body and a lens member of the modified marker lamp shown in FIG. 7. In FIGS. 7 and 8, like parts and components are designated by the same reference numerals as those in the first embodiment described above.

The modified marker lamp is provided with a reflector member 35 rising from an upper face of the main section 7 of a lamp base body 2A. The reflector member 35 is curved and a surface directing frontward is subjected to a reflection treatment to form a reflective surface 36.

The bulb mounting hole 10 having an opening directing in the up-down direction is formed in the main section of the lamp base body 2A at a position slightly frontward of the reflector member 35. The lamp bulb 5 is installed in the bulb mounting hole 10 in the same way as the first embodiment described above. Though not described here, every part of the reflector member 35 is appropriately designed to collimate light beams emitting from the filament 15 of the lamp bulb 5 and reflected by the reflective surface 36 of the reflector member 35.

FIGS. 9 through 13 show a vehicular marker lamp according to a second embodiment of the present invention.

Figure 9:
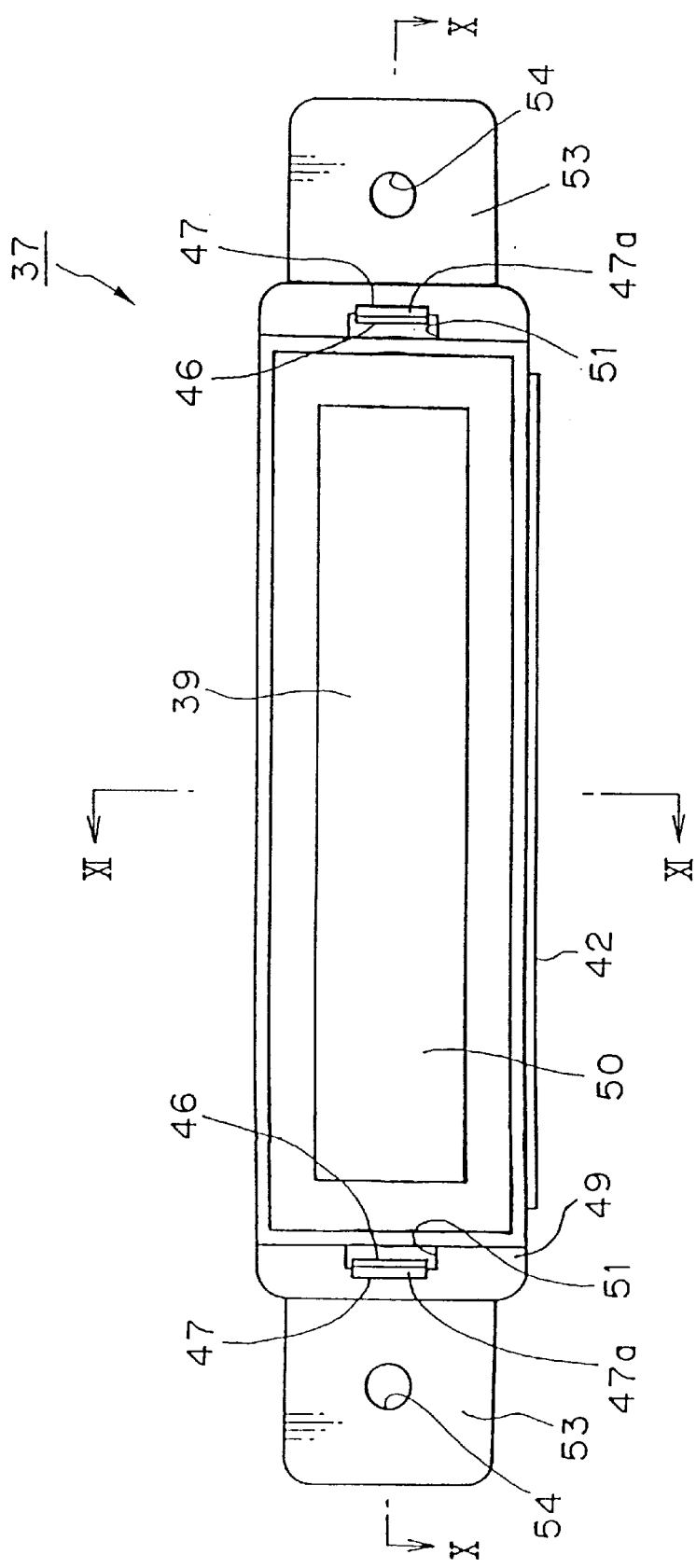
FIG. 9 is a front view of the vehicular marker lamp according to a second embodiment of the present invention.
Figure 10:
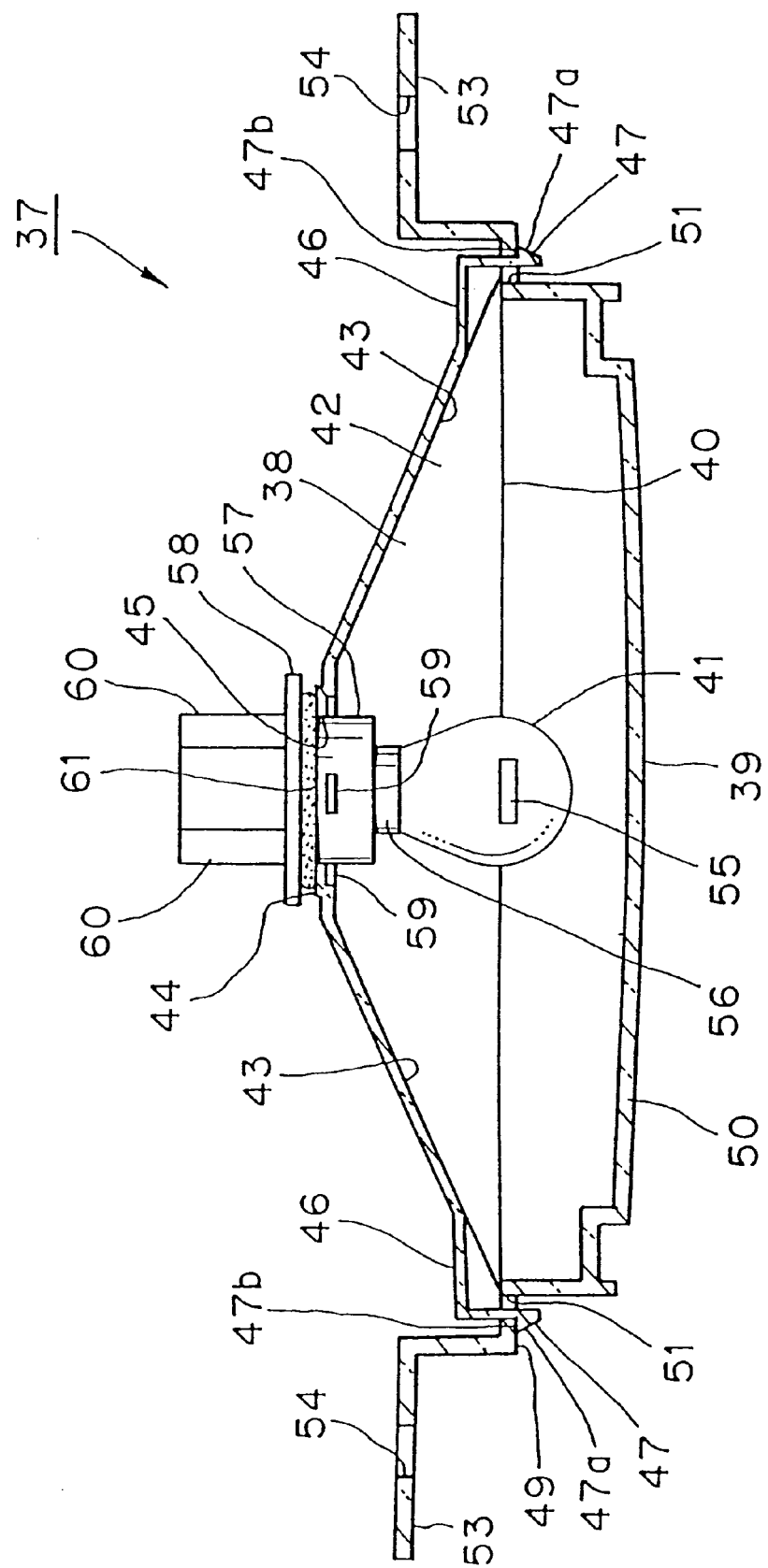
FIG. 10 is a sectional view cut along a line X—X in FIG. 9.
Figure 11:
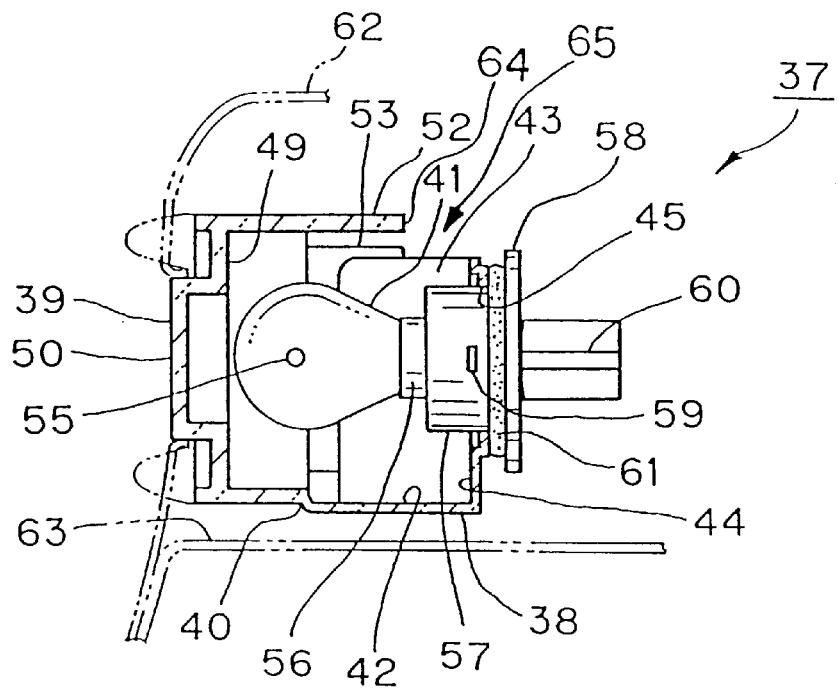
FIG. 11 is a sectional view cut along a line XI—XI in FIG. 9.
Figure 12:
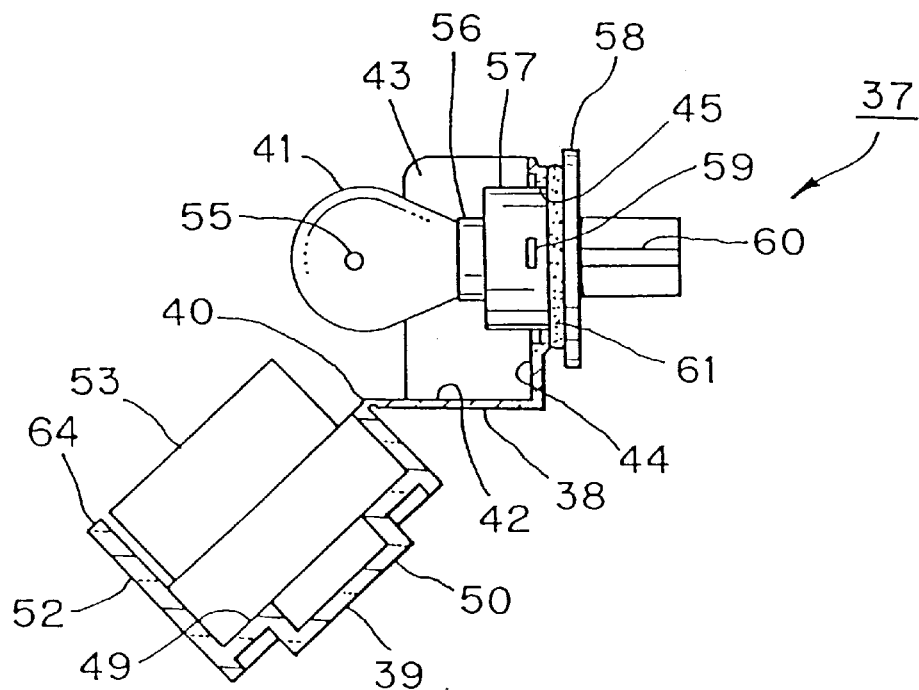
FIG. 12 is a sectional view showing a lens member detached from a lamp base body.
Figure 13:
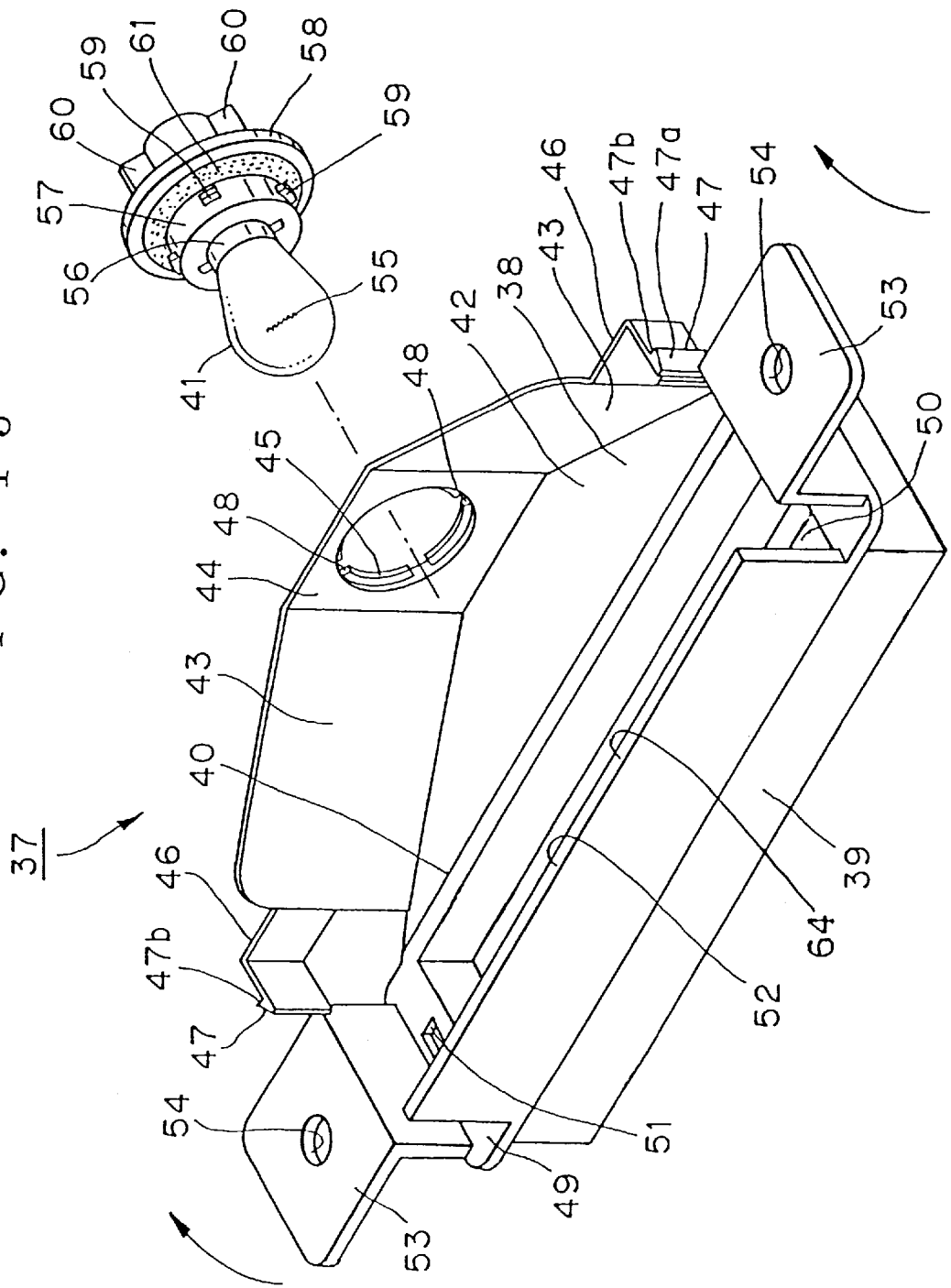
FIG. 13 is an exploded perspective view of the entire marker lamp according to the second embodiment of the invention.

Specifically, FIG. 9 is a front view of the vehicular marker lamp according to a second embodiment of the present invention, FIG. 10 is a sectional view cut along a line X—X in FIG. 9, FIG. 11 is a sectional view cut along a line XI—XI in FIG. 9, FIG. 12 is a sectional view showing a lens member detached from a lamp base body, and FIG. 13 is an exploded perspective view of the entire marker lamp according to the second embodiment of the invention.

In the second embodiment, the present invention is applied to a high-mount stop lamp of so-called a built-in type placed inside a rear wind shield of an automobile for enhancing visibility of a mark of stopping the automobile.

A high-mount stop lamp 37 is constituted by a lamp base body 38, a lens member 39 disposed at a front end part of the lamp base body 38 (hereinafter an upward direction, a downward direction, a leftward direction and a rightward direction of FIG. 11 are referred as an upward direction, a downward direction, a frontward direction and a rearward direction, respectively), an integral hinge 40 connecting the lens member 39 to the lamp base body 38, and a lamp bulb 41 installed at substantially a center of the lamp base body 38.

The lamp base body 38, the lens member 39 and the integral hinge 40 are integrally molded with a transparent or colored transparent material which is capable of forming lenses.

As best shown in FIG. 13, the lamp base body 38 is provided with a bottom wall 42 which is trapezoidal plate-like member, a couple of side walls 43 and a rear wall 44 rising from the side and rear peripheral edges, respectively, of the bottom wall 42, a bulb mounting hole 45 formed in the center of the rear wall 44, an engaging piece 46 projecting sideward from the front end of each of the side wall 43 and then bent frontward, and an engaging pawl 47 protruding outward from the front end part of each of the engaging piece 46.

The bulb mounting hole 45 formed in the rear wall 44 of the lamp base body 38 is formed with insertion notches 48 disposed symmetrically.

The lens member 39 is constituted by a main section 49 which is a flat-rectangular plate, a flat-rectangular illuminating section 50 formed by projecting frontward the major portion of the main section 49, vertically elongated engaging holes (or notches) 51 formed in the side end positions of the main section 49 an upper wall 52 projecting rearward from the upper end of the main section 49, mounting pieces 53 projecting rearward from both the side ends of the main section 49 and then bent sideward, and mounting holes 54 formed in the center of a part, which projects sideward, of each of the mounting pieces 53, the mounting holes 54 opening in the front-rear direction. Though not shown in the figures, the lens member 39 is formed with fish-eye lens member steps, Fresnel lens member steps or the like on a front and a rear surfaces thereof.

The integral hinge 40 is molded in such a manner that a thickness of which is slightly thinner than that of the lamp base body 38 and the lens member 39. The integral hinge 40 connects a front edge part of the lamp base body 38 and a lower edge part of the main section 49 of the lens member 39, so that the lamp base body 38 is integrally formed with the lens member 39 through the integral hinge 40.

The lamp bulb 41 has a filament 55 installed within a glass ball and a metal piece 56 which is detachably coupled to the socket 57. The socket 57, which is substantially cylindrical, is provided with a flange 58 projecting from a substantially center in the front-rear direction of an outer peripheral surface of the socket, engaging pieces 59 projecting symmetrically from the outer surface which is slightly upper than the flange 58. A couple of operation pieces 60 project opposite to each other from the outer surface of the socket 57 at a rear position of the flange 58. The operation pieces 60 extend in the axial direction of the socket 57 and connect continuously to a rear surface of the flange 58.

An O-ring 61 formed from a rubber material is mounted on the socket 57 contacting to a front of the flange 58.

Two dotted lines shown in FIG. 11 depict a rear end part of a vehicle body 62, which has a mounting part 63 for mounting the high-mount stop lamp 37.

During assembly, after the lamp bulb 41 is inserted from the bottom into the bulb mounting hole 45 formed in the rear wall 44 of the lamp base body 38 at a substantially center thereof, the engaging pieces 59 of the socket 57 on which the lamp bulb 45 is detachably supported is inserted in the insertion notches 48 formed in the bulb mounting hole 45, while grasping the operation pieces 60 formed on the rear portion of the outer surface of the socket 57 and urging the O-ring 61 mounted on the outer peripheral surface of the socket 57 against the rear surface of the rear wall 44 of the lamp base body 38, the socket is rotated in the circumferential direction thereof so that the opening edge part of the bulb mounting hole 45 is held by the engaging pieces 59 and the flange 58, thereby to mount the socket 57 to the bulb mounting hole 45.

When the lens member 39 is operated to pivot about the integral hinge 40 serving as a rotation fulcrum in such a manner that the lens member 39 comes into contact with the front surface of the lamp base body 38, the engaging holes 51 formed in the main section 49 of the lens member 39 come into engagement with the tip end of the respective engaging pieces 46 formed on the lamp base body 38 from the front thereof. Afterwards, when the lens member 39 is operated to pivot further, inclined surfaces 47a of the engaging pawls 47 formed on the engaging pieces 46 of the lamp base body 38 come into abutment against the outer corner of the engaging notches 51 formed in the lens member 39 so that the engaging pieces 46 are bent inward. Thereafter, when the lens member 39 is urged to pivot further, the engaging pieces and the engaging pawls 47 of the lamp base body 38 are inserted in the respective engaging holes 51 of the lens member 39. At the time when the engaging pawls 47 of the lamp base body 38 pass through the engaging holes 51 of the lens member 39 to protrude frontward therefrom, the bending of the engaging pieces 46 of the lamp base body 38 are returned to their original state, so that engaging faces 47b directing rearward of the engaging pawls 47 of the lamp base body 38 come into engagement with the opening edge part of the engaging holes 51 of the lens member 39. Hence, the lens member 39 is coupled to the lamp base body 38.

The high-mount stop lamp 37 of the present invention is so designed that, during assembly, a rear end part 64 of the upper wall 52, which serves as a pivot end part of the lens member 39, does not contact with the lamp base body 38 when the lens member 39 is operated to pivot with respect to the lamp base body 38 along the integral hinge 40. Therefore, a gap 65 is defined between the rear end part 64 of the upper wall 52 of the lens member 39 and the lamp base body 38, so that the undesirable increase of the temperature within the high-mount stop lamp 37 is suppressed.

The high-mount stop lamp 37 thus assembled is built in the mounting part 63 formed in the rear end part of the vehicle body 62, and the mounting holes 54 formed on the mounting pieces 53 of the lens member 39 is connected to the connecting device (not shown in the figures) and, thus, the high-mount stop lamp 37 is secured to the vehicle body 62.

Figure 14:
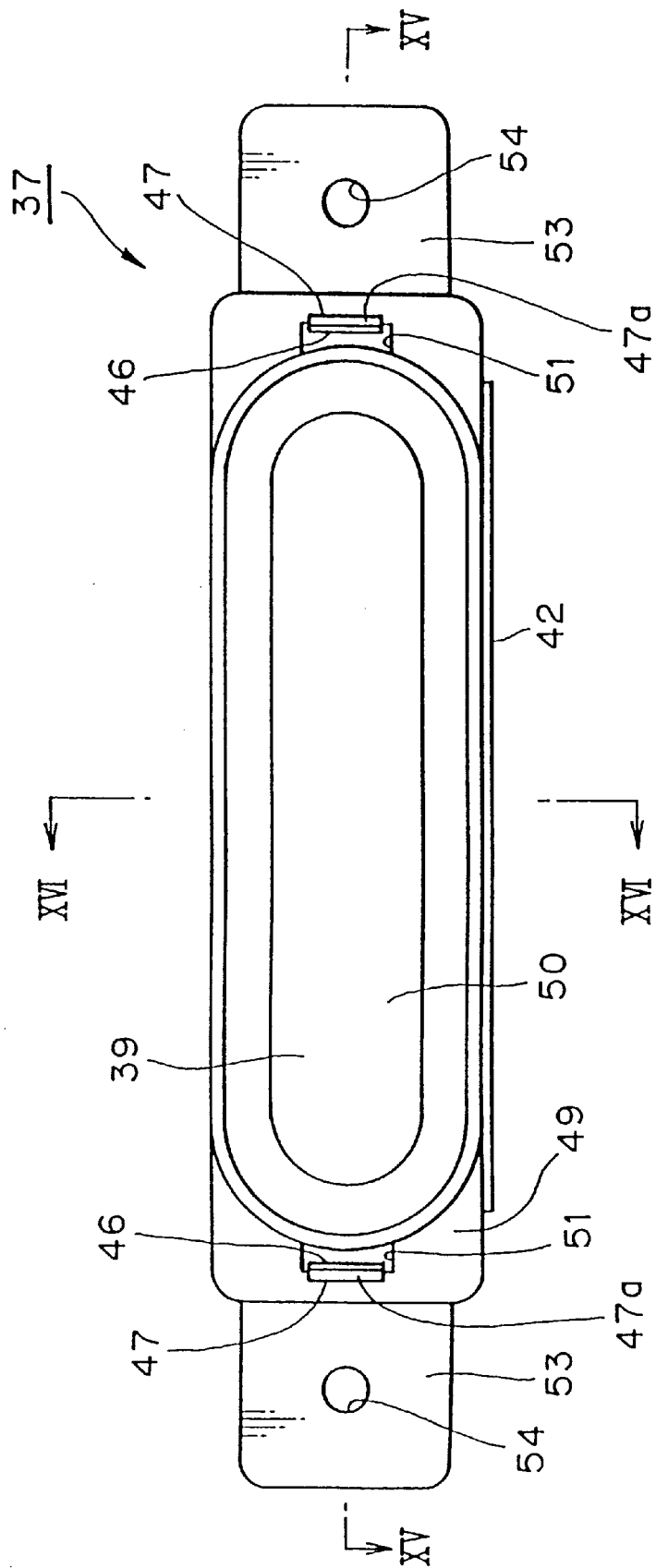
FIG. 14 is a front view of a modified vehicular marker lamp of the second embodiment of the present invention.
Figure 15:
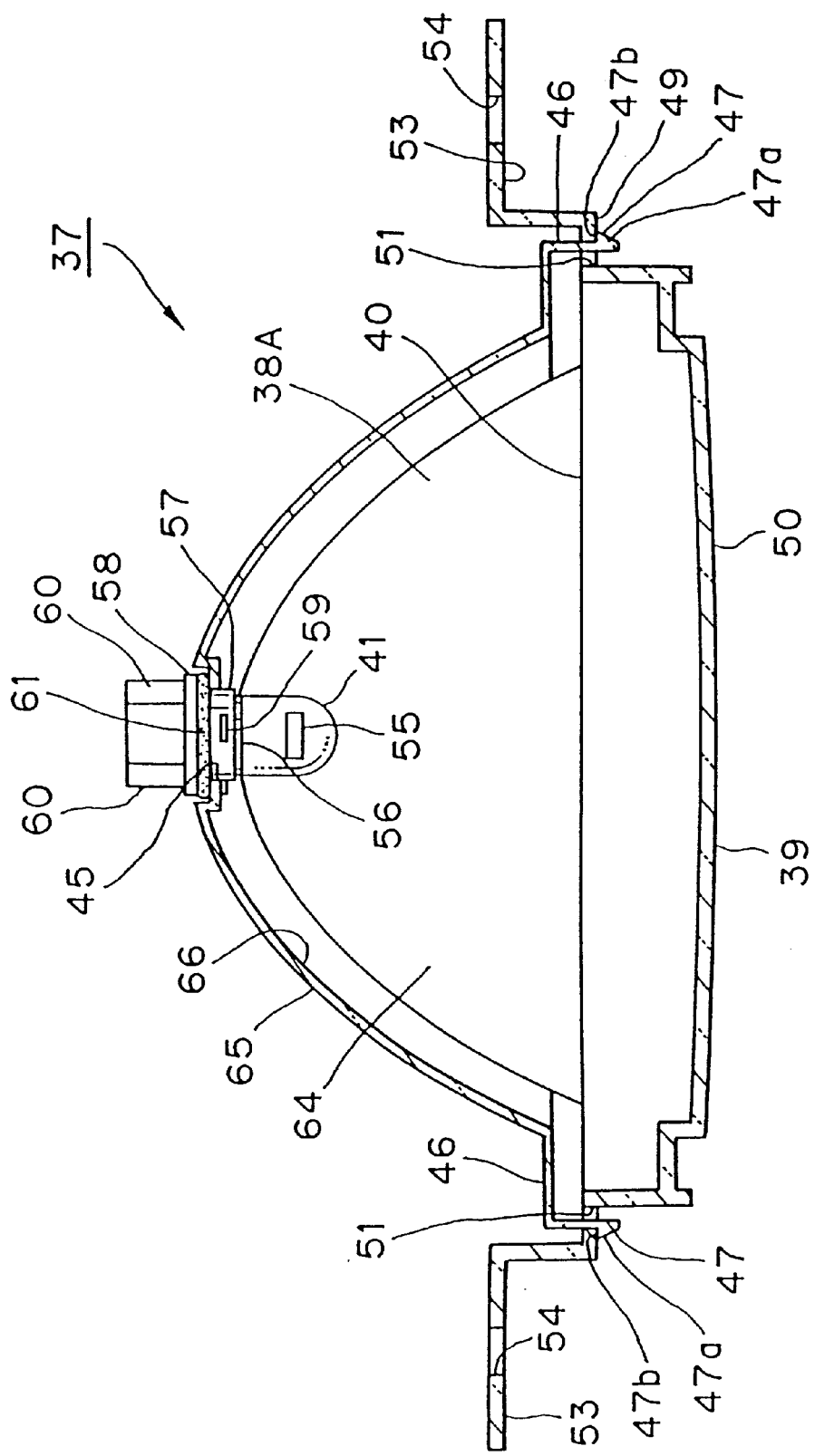
FIG. 15 is a sectional view of the vehicular marker lamp cut along a line XV—XV in FIG. 14.
Figure 16:
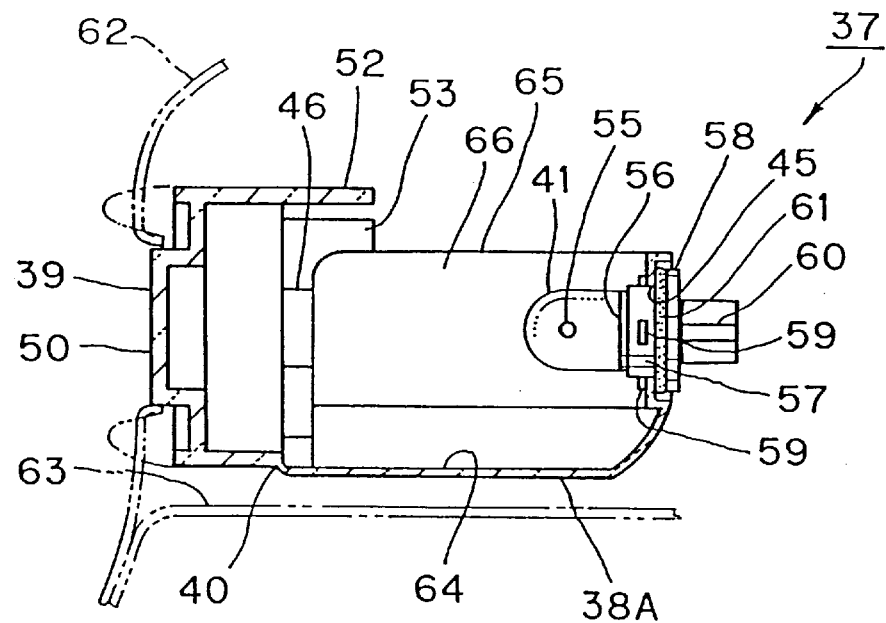
FIG. 16 is a sectional view of the vehicular marker lamp cut along a line XVI—XVI in FIG. 14.
Figure 17:
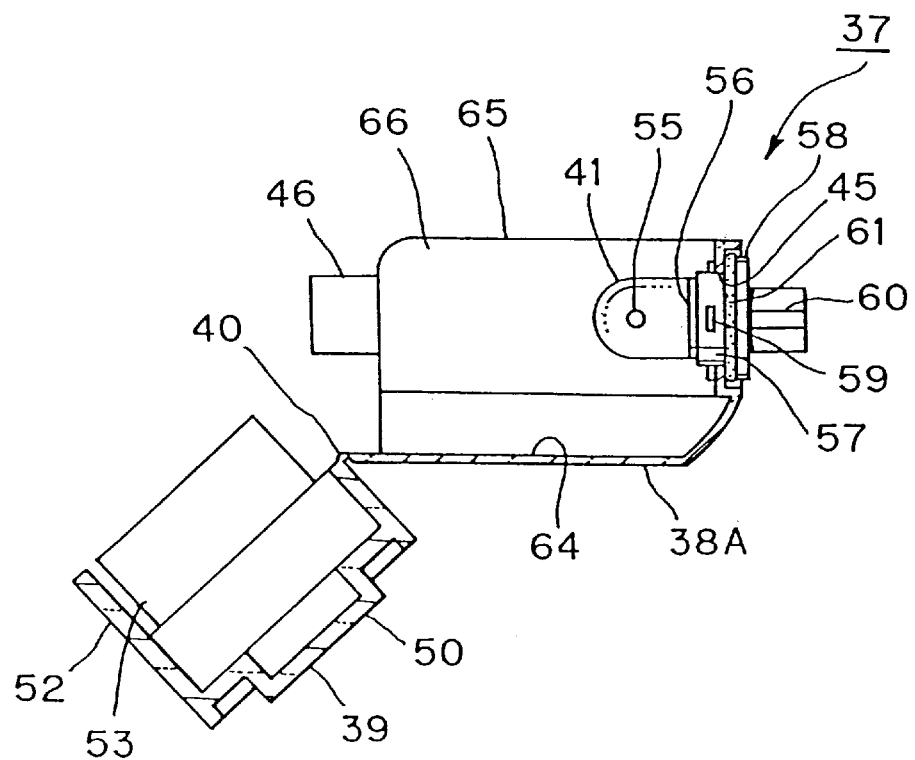
FIG. 17 is a sectional view showing a lens member detached from a lamp base body shown in FIG. 16.
Figure 18:
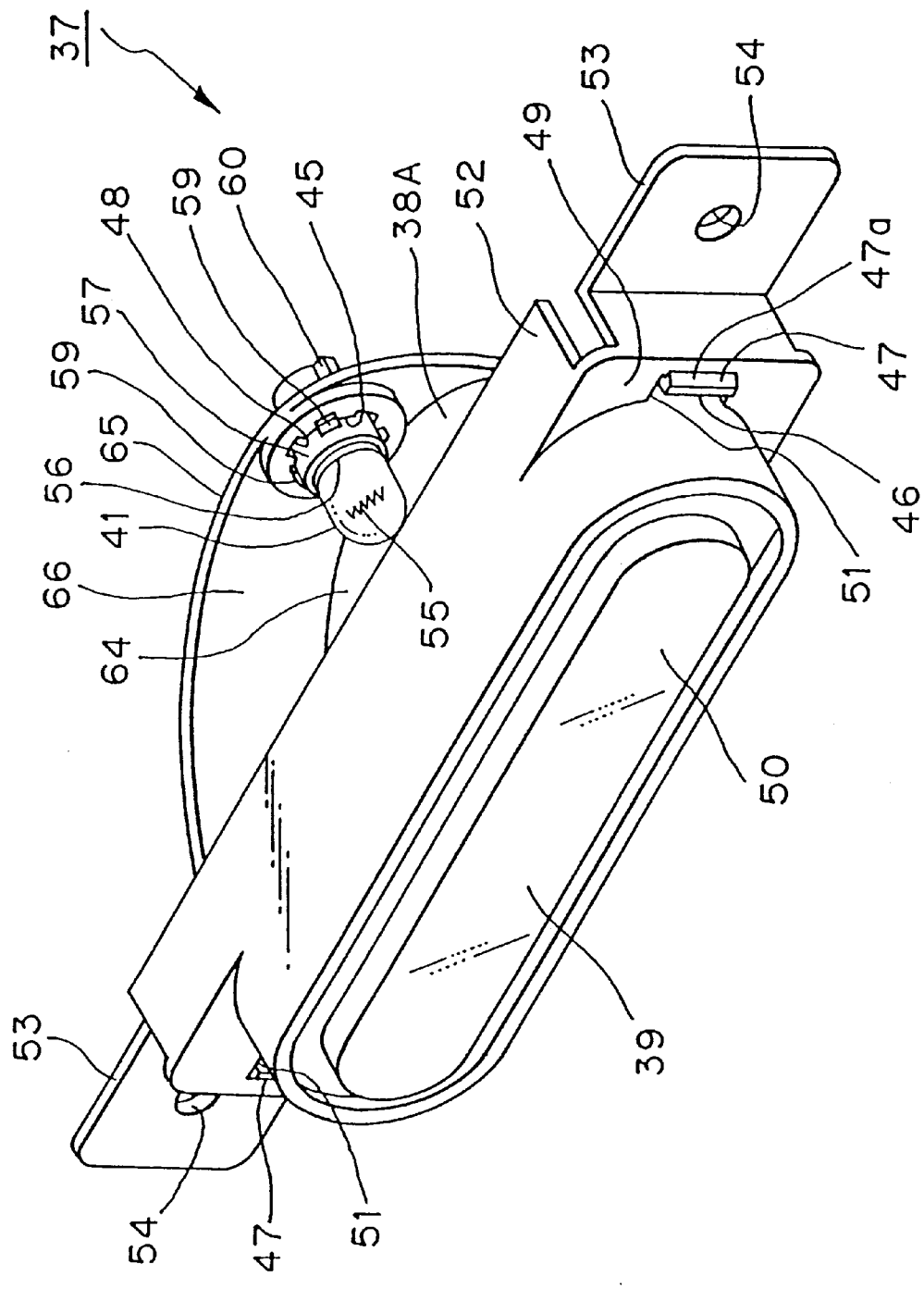
FIG. 18 is a perspective view of the entire marker lamp shown in FIG. 14.

FIGS. 14 through 18 concern a modified lamp base body 38 of the second embodiment of the present invention. Specifically, FIG. 14 is a front view of a modified vehicular marker lamp of the second embodiment of the present invention, FIG. 15 is a sectional view of the vehicular marker lamp cut along a line XV—XV in FIG. 14, FIG. 16 is a sectional view of the vehicular marker lamp cut along a line XVI—XVI in FIG. 14, FIG. 17 is a sectional view showing a lens member detached from a lamp base body shown in FIG. 16, and FIG. 18 is a perspective view of the entire marker lamp shown in FIG. 14.

In FIGS. 14 through 18, like parts and components of the lamp base body 38 are designated by the same reference numerals as those in the second embodiment described above, and the detailed description is omitted here.

A lamp base body 38A is provided with a bottom wall 64 which is a semi-circular plate-like member and a reflector member 65 rising from a peripheral edge of the bottom wall 64. An inner surface of the reflector member 65 of the lamp base body 38A is subjected to a reflection treatment to form a reflective surface 66.

The lamp bulb 41 is installed in the bulb mounting hole 45 in the same way as the first embodiment described above. Though not described here, every part of the reflector member 65 is appropriately designed to reflect light beams in parallel with an optical axis not shown, which light beams emit from the filament 55 of the lamp bulb 41 and reflected by the reflective surface 66 of the reflector member 65.

Figure 19:
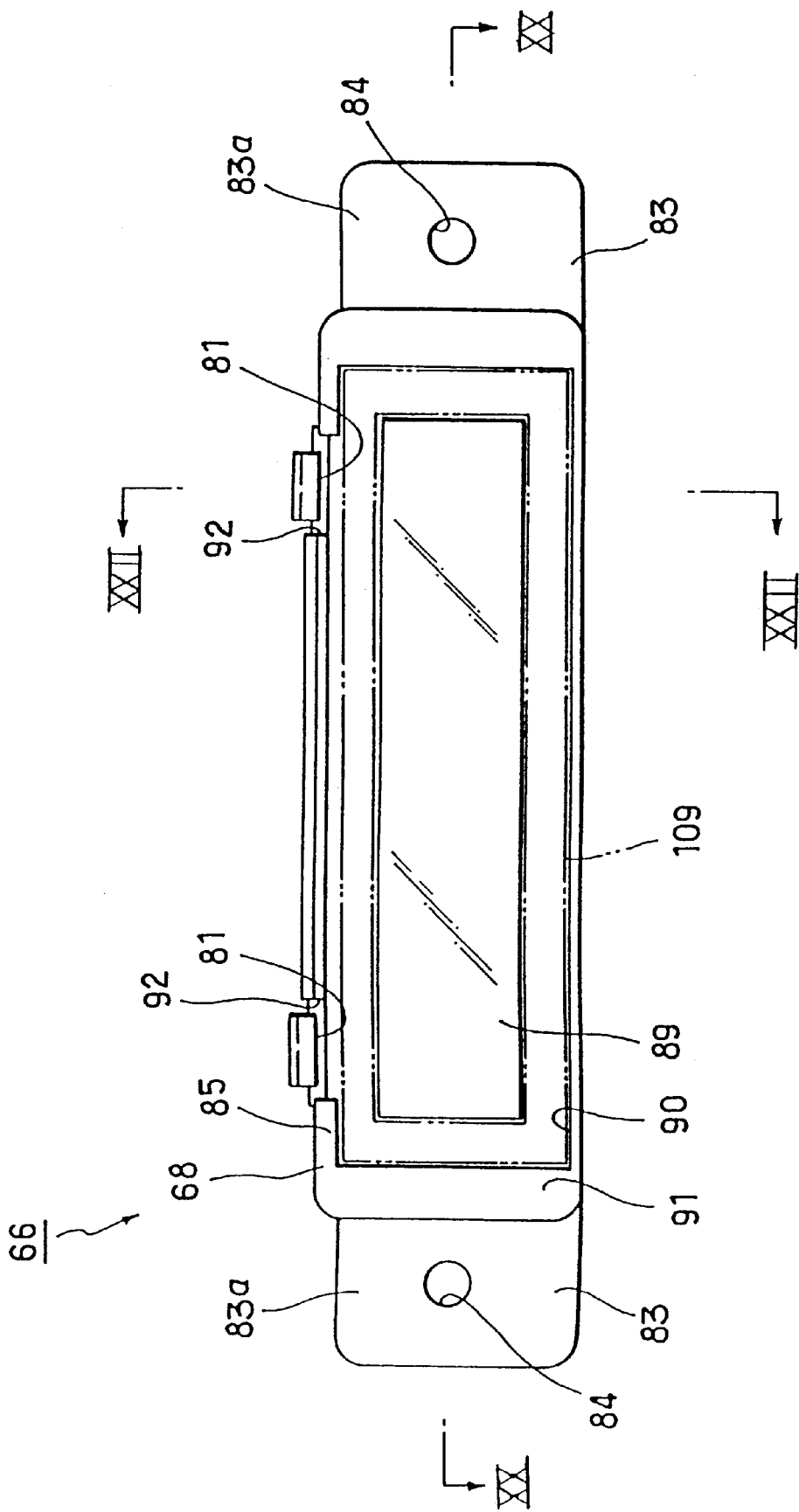
FIG. 19 is a front view of the vehicular marker lamp according to a third embodiment of the present invention.
Figure 20:
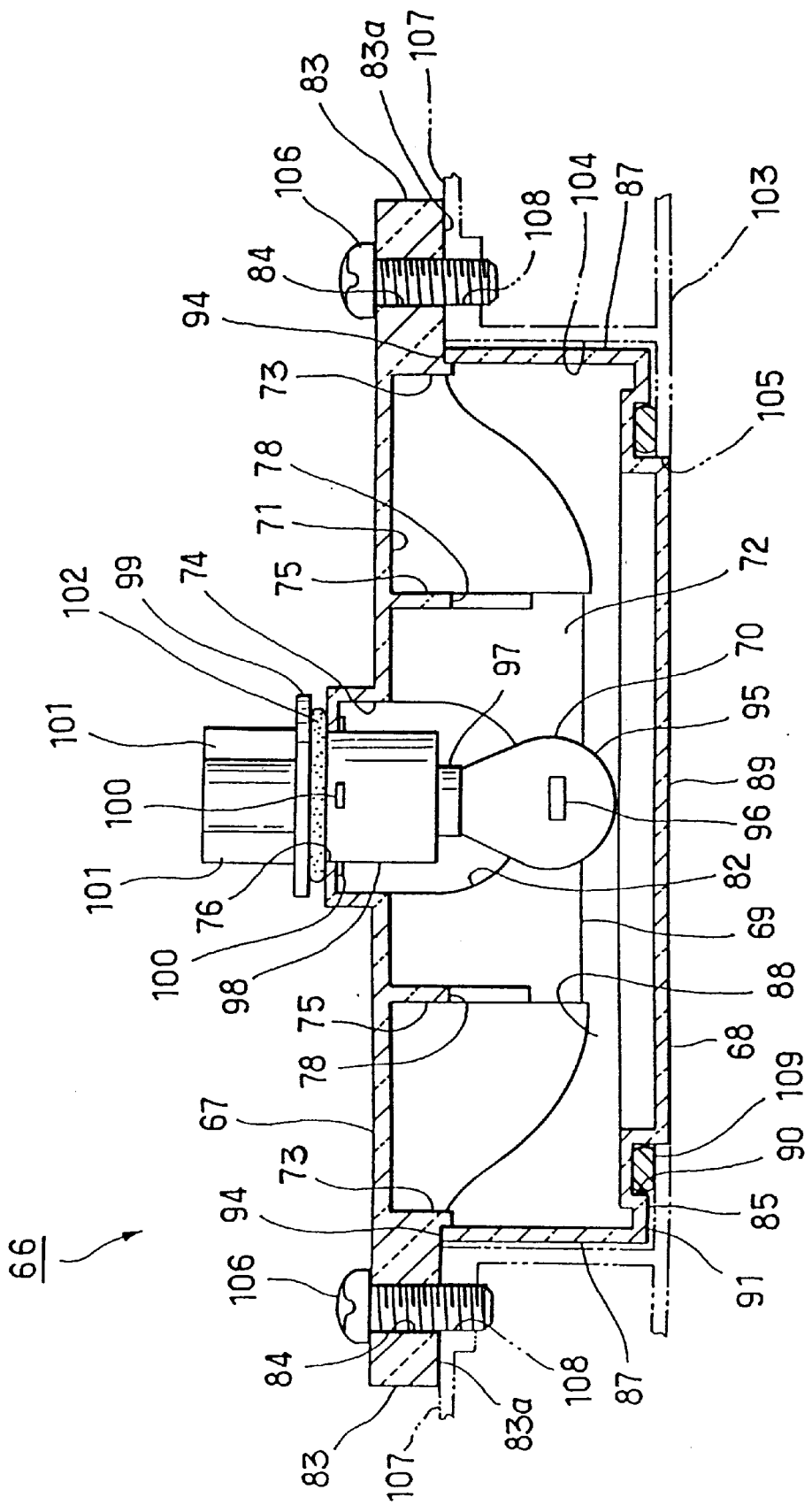
FIG. 20 is a sectional view cut along a line XX—XX in FIG. 19.
Figure 21:
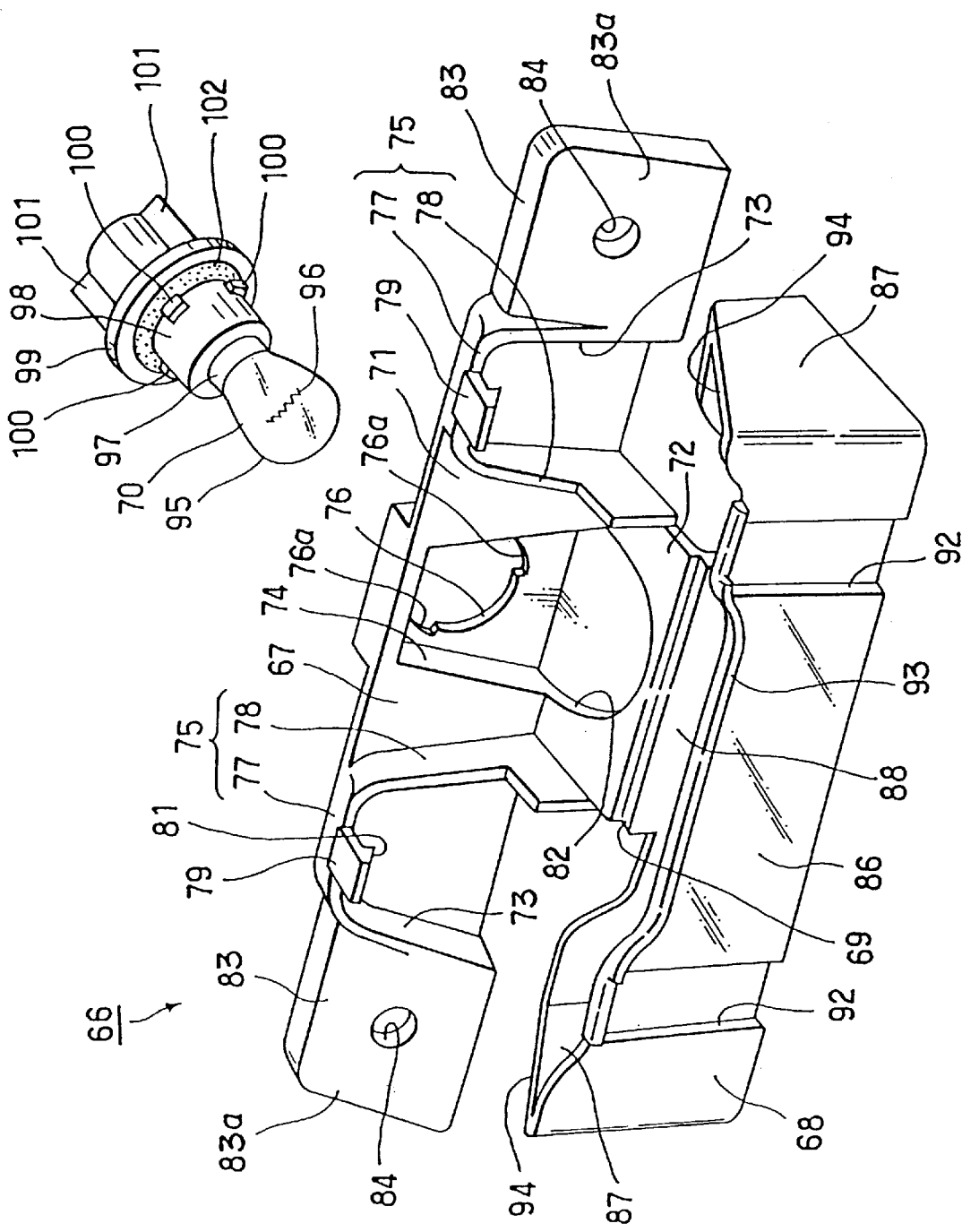
FIG. 21 is an exploded perspective view of the entire marker lamp according to the third embodiment of the invention.
Figure 22:
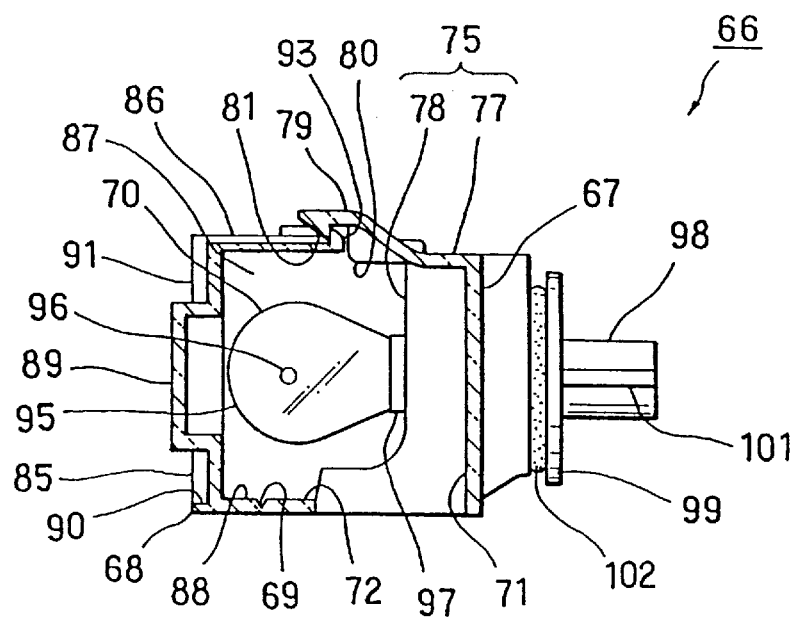
FIG. 22 is a sectional view cut along a line XXII—XXII in FIG. 19.
Figure 23:
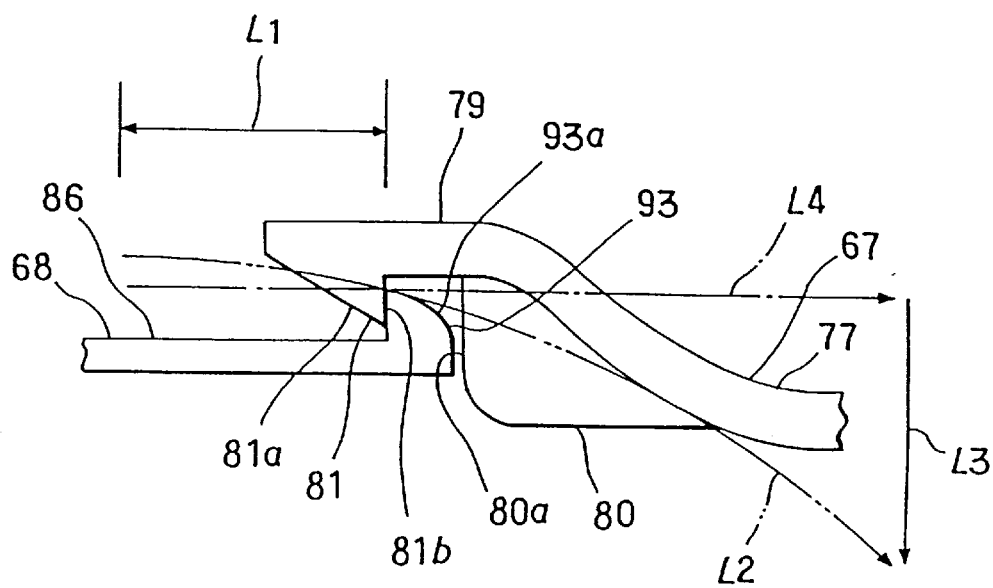
FIG. 23 is an enlarged view of an essential part of the vehicular marker lamp shown in FIG. 19.
Figure 24:
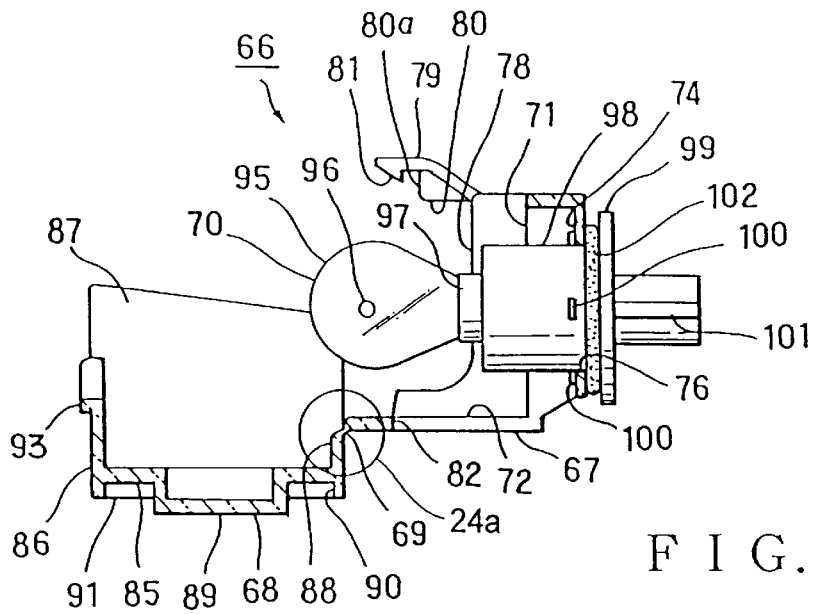
FIG. 24 is a sectional view showing a lens member detached from a lamp base body shown in FIG. 22.
Figure 24A:
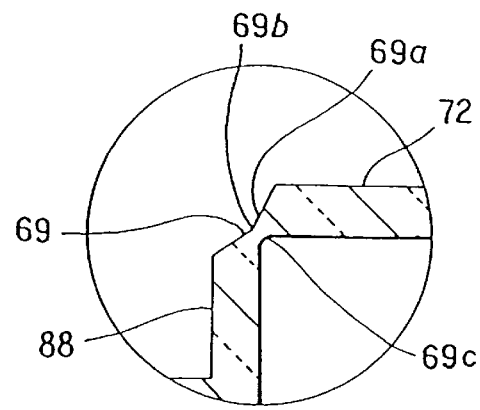

FIGS. 19 through 24 show a vehicular marker lamp according to a third embodiment of the present invention. Specifically, FIG. 19 is a front view of the vehicular marker lamp according to a third embodiment of the present invention, FIG. 20 is a sectional view cut along a line XX—XX in FIG. 19, FIG. 21 is an exploded perspective view of the entire marker lamp according to the third embodiment of the invention, FIG. 22 is a sectional view cut along a line XXII—XXII in FIG. 19, FIG. 23 is an enlarged view of an essential part of the vehicular marker lamp shown in FIG. 19, and FIG. 24 is a sectional view showing a lens member detached from a lamp base body shown in FIG. 22.

In the third embodiment, as similar to the second embodiment, the present invention is applied to a high-mount stop lamp of so-called a built-in type disposed on a rear end part of an automobile for enhancing visibility of a mark of stopping the automobile.

A high-mount stop lamp 66 is constituted by a lamp base body 67, a lens member 68 disposed at a front end part of the lamp base body 67 (hereinafter an upward direction, a downward direction, a leftward direction and a rightward direction of FIG. 17 are referred as an upward direction, a downward direction, a frontward direction and a rearward direction, respectively), an integral hinge 69 connecting the lens member 68 to the lamp base body 67, and a lamp bulb 70 installed at substantially a center of the lamp base body 67.

The lamp base body 67, the lens member 68 and the integral hinge 69 are integrally molded with a transparent or colored transparent material which is capable of forming lenses.

The lamp base body 67 is constituted by a laterally elongated plate-like rear wall 71, a generally rectangular bottom wall 72 projecting frontward from an end part of a lower-center of the rear wall 71, and a couple of side walls 73 disposed at both left and right side edges of the rear wall 71.

The rear wall 71 of the lamp base body 67 is provided with a recessed portion 74 formed in a center thereof, a couple of reinforcing ribs 75 disposed at both the left and right sides of the recessed portion 74. A bulb mounting hole 76 is formed in a rear surface of the recessed portion 74 for mounting thereto the lamp bulb 70, and insertion notches 76a are formed along the periphery of the bulb mounting hole 76.

As best shown in FIG. 21, each of the reinforcing ribs 75 is provided with a horizontal piece 77 extending horizontally along an upper edge of the rear wall 71 of the lamp base body 67 and a vertical piece 78 extending downward from the upper edge of the lamp base body 71. A lower part of the vertical piece 78 projects frontward more than an upper part thereof. Since the horizontal piece 77 connects continuously to the vertical piece 78, the reinforcing rib 75 is shaped like an inverted character L looking in the front-rear direction. Thus, the reinforcing ribs 75 project frontward from the rear wall 71 of the lamp base body 67 at positions closed to the left or right sides thereof.

The horizontal pieces 77 of the reinforcing ribs 75 is slightly curved upward in such a manner that the pieces projecting frontward from the upper edge of the rear wall 71 direct slightly upward as they go frontward. An outer edge of each of the horizontal pieces 77 connects continuously to an upper edge of the respective side wall 73 of the lamp base body 67.

The vertical pieces 78 of the reinforcing ribs 75 are L-shaped plates viewing in the left-right direction. The vertical pieces 78 extend vertically along the rear wall 71, and a lower edge of which connects continuously to side edges of the bottom wall 72 of the lamp base body 67.

As best shown in FIG. 23, each of the horizontal pieces 77 of the reinforcing ribs 75 is provided with an engaging piece 79 and a contact rib 80 projecting therefrom. The engaging piece 79 projects frontward from a front end of the horizontal piece 77 at a position substantially center in the left-right direction thereof, and the contact rib 80 extends from a part of the horizontal piece 77 which is curved upwardly, at a center position in the left-right direction of the part.

As shown in FIG. 23, each of the engaging piece 79 is formed with an engaging pawl 81 extending downward from a lower face of a tip end part thereof. The engaging pawl 81 has an inclined surface 81a directing downward as it goes rearward and an engaging surface 81b extending vertically upward from a rear end part of the inclined surface 81a.

A front end of each of the contact ribs 80 serves as a contact edge 80a.

A generally semi-circular opening 82 is formed in a center of the bottom wall 72 of the lamp base body 67 for reducing the amount of the material for the lamp base body 67 and also for suppressing the increase of the temperature within the lamp base body 67. The rear end of the opening 82 is continuous to the opening formed in the lower end part of the recessed portion 74 formed in the rear wall 71. Further, the integral hinge 69 is formed integrally with the bottom wall 72 at the front end thereof.

As best shown in FIG. 21, mounting pieces 83 project laterally from the surfaces directing outward of the side walls 73. Each of the mounting pieces 83 is inclined with respect to the rear wall 71 of the lamp base body 67 to form a front surface 83a in such a manner that the front surface 83a of the mounting piece 83 is inclined frontward as it goes downward. A mounting hole 84 is formed in each of the mounting pieces 83 at a substantially center thereof.

The lens member 68 is constituted by a front wall 85 which is a flat-rectangular plate, an upper wall 86 projecting rearward from an upper edge of the front wall 85, a couple of side walls 87 projecting rearward from both the side edges of the front wall 85, and a bottom wall 88 projecting rearward from a lower edge of the front wall 85.

The front wall 85 of the lens member 68 is provided with a flat-rectangular illuminating section 89 formed by projecting frontward the major part of the front wall 85, a frontwardly opening fitting groove 90 surrounding the illuminating section 89 for fitting therein a gasket described below, and a contact surface 91 surrounding the fitting groove 90. As illustrated in FIG. 24, a front surface of the illuminating section 89 locates slightly frontward from a position of the front surface of the contact surface 91 viewing from the side of the lamp. Though not shown in the figures, the illuminating section 89 of the lens member 68 is formed with fish-eye lens steps, Fresnel lens steps or the like on a front and a rear surfaces thereof.

As best shown in FIG. 21, the upper wall 86 of the lens member 68 has an upwardly directing surface in which a couple of engaging grooves 92 and a couple of engaging-protruding pieces 93 are formed. The engaging grooves 92 are disposed on positions close to both the left and right ends of the lens member 68 and extend in the front-rear direction thereof. A front end of each of the engaging grooves 92 extends to reach the fitting groove 90 of the front wall 85. The engaging-protruding pieces 93 extend in the left-right direction along the rear edge of the upper wall 86 and protrude upward. As shown in FIG. 23, the engaging-protruding pieces 93 is formed with a chamfered section 93a at an upper-rear corner thereof.

As shown in FIG. 21, a rear end surface of the side wall 87 of the lens member 68 serves as a contact surface 94 which is inclined in such a manner that the contact surface directs frontward as it goes downward. The contact surface 94 surface-contacts with the front surface 83a of the mounting piece 83.

A part of the rear edge of the bottom wall 88 of the lens member 68, except for both the left and right side edges thereof, is calmly cut frontward, and an integral hinge 69 is formed on the rear edge at a center position in the left-right direction. It is designed that the position where the integral hinge 69 is formed is disposed frontward from the position where the engaging-protruding pieces 93 of the upper wall 86 of the lens member 68 are located viewing from the side thereof.

The integral hinge 69 is formed with a V-shaped groove 69a at an upper surface thereof in such a manner that the thickness of the integral hinge 69 is thinner than the thickness of the lamp base body 67 and the lens member 68. The integral hinge 69 connects the bottom wall 72 of the lamp base body 67 to the bottom wall 88 of the lens member 68 so that the lamp base body 67 is integrally formed with the lens member 68 through the integral hinge 69.

The lamp bulb 70 has a filament 96 installed within a 5 glass ball 95 and a metal piece 97 which is detachably coupled to a socket 98. The socket 98, which is substantially cylindrical, is provided with a flange 99 projecting from a substantially center in the front-rear direction of an outer peripheral surface of the socket, engaging pieces 100 projecting parabolicly from the outer surface which is slightly upper than the flange 99. A couple of operation pieces 101 project opposite to each other from the outer surface of the socket 98 at a rear position of the flange 99. The operation pieces 101 extend in the axial direction of the socket 98 and connect continuously to a rear surface of the flange 99.

An O-ring 102 formed from a rubber material is mounted on the socket 98 contacting to a front of the flange 99.

Two dotted lines shown in FIG. 20 depict a rear end part of a vehicle body 103, which has a mounting part 104 having a size enough to built-in the high-mount stop lamp 66. A facing hole 105 is formed in a front end part of the mounting part 104 for facing the illuminating section 89 of the lens member 68 to the outside. Thread-engaging portions 107 each having a thread-engaging hole 108 are formed in both the left and right sides sandwiching the mounting part 104 for securing the mounting piece 83 of the high-mount stop lamp 66 to the vehicle body 103 by screws 106.

During assembly, after the lamp bulb 70 is inserted from the bottom into the bulb mounting hole 76 formed in the rear wall 71 of the lamp base body 67 at a substantially center thereof, the engaging pieces 100 of the socket 98 on which the lamp bulb 70 is detachably supported is inserted in the insertion notches 76a formed in the bulb mounting hole 76, while grasping the operation pieces 101 formed on the rear portion of the outer surface of the socket 98 and urging the Oring 102 mounted on the outer peripheral surface of the socket 98 against the rear surface of the rear wall 71 of the lamp base body 67, the socket is rotated in the circumferential direction thereof so that the opening edge part of the bulb mounting hole 76 is held by the engaging pieces 101 and the flange 99, thereby to mount the socket 98 to the bulb mounting hole 76.

When the lens member 68 is operated to pivot about the integral hinge 69 serving as a rotation fulcrum in such a manner that the chamfered section 93a disposed at the rear part of the engaging-protruding pieces 93 of the upper wall 86 of the lens member 68 comes into contact with the inclined surface 81a of the engaging pawl 81 formed on the engaging piece 79 of the lamp base body 67 so that the engaging pieces 79 are bent upward. Afterwards, when the lens member 68 is operated to pivot further, the engaging pawl 81 of the engaging piece 79 of the lamp base body 67 climbs over the engaging-protruding pieces 93 of the lens member 68. In this step, the chamfered section 93a is formed on the rear end of the engaging-protruding pieces 93 of the lens member 68 allows the engaging pawl 81 can easily climb over the engaging-protruding pieces 93.

Further, the integral hinge 69 performing as a pivotal fulcrum of the lens member 68 is designed to locate in front in the plan view of the engagement position of the lamp base body 67 and the lens member 68 by a distance LI as shown in FIG. 23, so that the engaging-protruding pieces 93 of the lens member 68 moves along a two-dotted arcuate line L2 shown in FIG. 23. Because the arcuate line L2 directs downward as it goes rearward, the engaging piece 79 bends relatively merely slightly when the engaging-protruding piece 93 of the lens member 68 engages with the engaging pawl 81 of the lamp base body 67, thereby to reduce the load applied to the engaging piece 79.

When the engaging pawl 81 of the lamp base body 67 climbs over the engaging-protruding piece 93 of the lens member 68, the bending engaging piece 79 of the lamp base body 67 returns to its original state so that the engaging surface 8lb of the engaging pawl 81 of the lamp base body 67 comes into engagement with the frontwardly directing surface of the engaging-protruding piece 93 of the lens member 68. At the same time, the contact surface 94 of the side wall 87 of the lens member 68 comes into contact with the front surface 83a of the mounting piece 83 of the lamp base body 67, so that the lens member 68 is disposed in front of the lamp base body 67.

Then, after engaging the engaging-protruding piece 93 with the engaging pawl 81 of the lamp base body 67, when the lens member 68 continues to move further along the arcuate line L2, the engaging-protruding piece 93 may generally easily disengage from the engaging pawl 81. However, according to the present invention, because the rear end of the engaging-protruding piece 93 comes into abutment against the contact edge 80a of the contact piece 80 extending from the lower surface of the horizontal piece 77 of the reinforcing rib 75, the engaging-protruding piece 93 of the lens member 68 does not move further after engaging with the engaging pawl 81 of the lamp base body 67.

With the structure as described above, the engaging pawl 81 of the lamp base body 67 is always urged downward against the engaging-protruding piece 93 of the lens member 68 with a force in the direction of an arrow L3 shown in FIG. 23 to secure the engagement. Therefore, the engaging pawl 81 hardly disengages from the engaging-protruding piece 93 even if an unexpected external force in the direction of an arrow L4 as shown in FIG. 23 is applied to the engaging piece 79 or the engaging pawl 81 or the like of the lamp base body 67.

Further, since the lens member 68 pivots with respect to the lamp base body 67 about a peak 69b, serving as a pivotal fulcrum, of the V-shaped groove 69a formed in the inner surface of the integral hinge 69, the lens member 68 can easily be positioned accurately with respect to the lamp base body 67 merely by pivoting the lens member 68 with respect to the lamp base body 67. Furthermore, a surface 69c of the integral hinge 69 opposite of the peak 69b of the V-shaped groove 69a thereof is a portion to which generally the largest stress is applied among the parts of the integral hinge 69 when the lens member 68 is operated to pivot with respect to the lamp base body 67. However, since the surface 69c is curved as shown in FIG. 24, the stress can be effectively dispersed and, accordingly, the life of the integral hinge 69 can be extended.

A gasket formed from a rubber material or the like is fitted in the fitting groove 90 of the lens member 68 of the high-mount stop lamp 66 thus constructed, and then the lamp is installed in the mounting part 104 formed in the rear portion of the vehicle body 103.

After that, screws 106 are inserted in the mounting holes 84 of the mounting pieces 83 formed on the lamp base body 67, and the screws 106 screw-engage with the thread-engaging hole 108 formed in the thread-engaging portions 107 of the vehicle body 103. Then, the contact surfaces 94 of the side walls 87 of the lens member 68 are pushed by the front surfaces 83a of the mounting pieces 83 of the lamp base body 67, and the contact surface 91 of the lens member 68 comes into contact with the inner surface of the mounting part 104 to thereby squash the gasket 109, so that the illuminating section 89 of the lens member 68 is fitted in the facing hole 105 of the vehicle body 103 while enhancing the water-proof property. Thus, the high-mount stop lamp 66 is installed in the vehicle body 103.

Accordingly, even if the integral hinge 69 is broken after installing the high-mount stop lamp 66 in the vehicle body 103, the illuminating section 89 of the lens member 68 keeps fitting in the facing hole 105 of the vehicle body 103 whereas front surfaces 83a of the mounting piece 83 of the lamp base body 67 keep urging the contact surfaces 94 of the side walls 87 of the lens member 68. For the reasons, the lens member 68 never deviates from the vehicle body 103.

Figure 25:
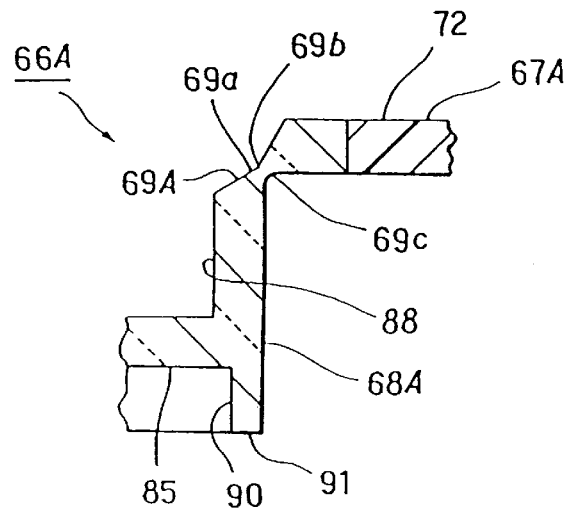
FIG. 25 is an enlarged sectional view of essential parts of a modified marker lamp of the third embodiment of the invention.
Figure 26:
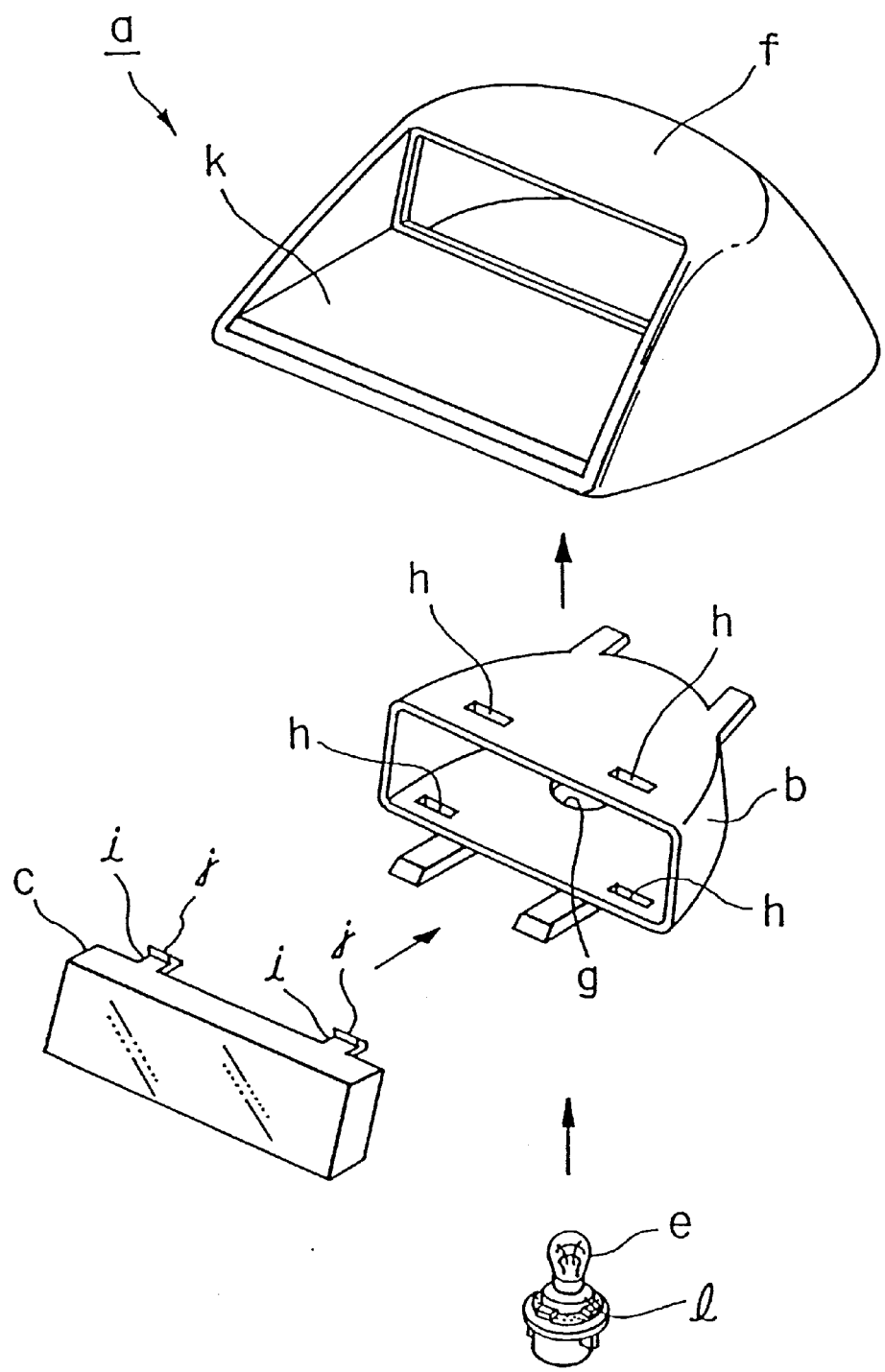
FIG. 26 is an exploded perspective view showing a high-mount stop lamp placed inside a rear wind shield of an automobile for enhancing visibility of a mark of stopping the automobile, which is one example of a conventional vehicular marker lamp.
Figure 27:
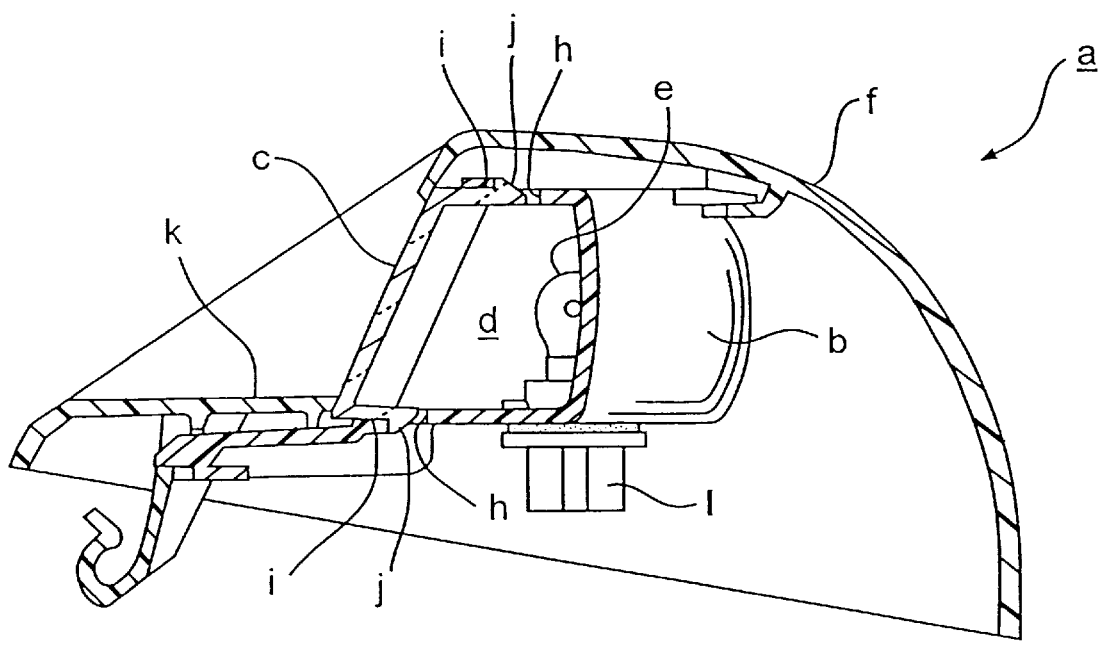
FIG. 27 is a sectional view of the conventional high-mount stop lamp shown in FIG. 26.

FIG. 25 is an enlarged sectional view of essential parts of a modified high-mount stop lamp 66 of the third embodiment of the invention. In FIG. 25, like parts and components are designated by the same reference numerals as those of the high-mount stop lamp 66 in the third embodiment described above.

A lamp base body 67A of a high-mount stop lamp 66A is formed from, for example, an opaque synthetic resin, and an end of a bottom wall 72 is continuously molded to a rear end of a bottom wall 88 of a lens member 68A by a two-color molding operation or the like. An integral hinge 69A is formed at a position closed to the rear end of the bottom wall 88 of the lens member 68A.

According to the modified high-mount stop lamp described above, compared with the high-mount stop lamps according to the first to third embodiments of the invention, since the lamp base body 67A and the lens member 68A can be formed from the different materials which are appropriate for each member, the material can be freely selected. This is advantageous in that, for example, the cost for manufacturing the high-mount stop lamp can be reduced or durability of which can be improved.

As described above, a marker lamp of the present invention provides a lamp base body and a lens member disposed on a front end part of the lamp base body, which are installed in a cover body, characterized in that the lamp base body and the lens member are integrally coupled to each other by an integral hinge.

More specifically, the vehicular marker lamp according to the present invention is constituted by integrally molding a lamp base body to which a light source is installed, a lens member coupled to a front end part of the lamp base body for controlling illumination light beam emitting from the light source and an integral hinge connecting the lens member to the lamp base body, using a mold material which is capable of forming lenses.

According to another aspect of the invention, the vehicular marker lamp is constituted by integrally molding a lamp base body to which a light source is installed, a reflector member subjected to reflection treatment and formed integrally with the lamp base body for controlling the illumination light beam emitting from the light source, a lens member coupled to a front end part of the lamp base body for controlling illumination light beam reflected by the reflector member, and an integral hinge connecting the lens member to the lamp base body, using a mold material which is capable of forming lenses.

According to the vehicular marker lamp of the present invention, since the lamp base body and the lens member are integrally connected to each other by the integral hinge to provide a single unit, the number of components can be reduced.

Therefore, since the lens member can be accurately positioned with respect to the lamp base body merely by bending the lens member at the integral hinge, the workability during the assembly of the marker lamp can be simplified.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A vehicular lamp comprising:

a lamp base body, the lamp base body including a laterally elongated plate-like rear wall, a generally rectangular bottom wall projecting frontward from an end part of a lower-center of the rear wall, and a couple of side walls disposed at both left and right side edges of the rear wall, wherein the rear wall of the lamp base body has a recessed portion formed in a center thereof, a pair of reinforcing ribs disposed at opposite sides of the recessed portion;

a lens member disposed at a front end part of the lamp base body;

an integral hinge connecting the lens member to the lamp base body; and a lamp bulb disposed substantially at a center of the lamp base body with respect to an elongated direction of the lamp base body.

2. The vehicular lamp according to claim 1, wherein a bulb mounting hole is formed in a rear surface of the recessed portion for mounting thereto the lamp bulb, and insertion notches are formed along a periphery of the bulb mounting hole.

3. The vehicular lamp according to claim 1, wherein each of the reinforcing ribs comprises a horizontal piece extending horizontally along an upper edge of the rear wall of the lamp base body and a vertical piece extending downward from the upper edge of the lamp base body.

4. The vehicular lamp according to claim 3, wherein a lower part of the vertical piece projects frontward more than an upper part thereof.

5. The vehicular lamp according to claim 3, wherein the horizontal pieces of the reinforcing ribs are slightly curved upward in such a manner that the pieces projecting frontward from the upper edge of the rear wall direct slightly upward as they go frontward, and an outer edge of each of the horizontal pieces connects continuously to an upper edge of the respective side wall of the lamp base body.

6. The vehicular lamp according to claim 3, wherein the vertical pieces of the reinforcing ribs are L-shaped plates as viewed along the elongated direction of the rear wall, the vertical pieces extend vertically along the rear wall, and a lower edge of each of the vertical pieces connects continuously to a side edge of the bottom wall of the lamp base body.

7. The vehicular lamp according to claim 6, wherein each of the horizontal pieces of the reinforcing ribs comprises an engaging piece and a contact rib projecting therefrom, the engaging piece projects frontward from a front end of the horizontal piece at a position substantially at a center position of the horizontal piece with respect to the elongated direction of the rear wall, and the contact rib extends from a part of the horizontal piece at the center position.

8. The vehicular lamp according to claim 7, wherein each engaging piece comprises an engaging pawl extending downward from a lower face of a tip end part thereof, the engaging pawl comprises an inclined surface sloping downward in the rearward direction and an engaging surface extending vertically upward from a rear end part of the inclined surface.

9. The vehicular lamp according to claim 1, wherein a generally semi-circular opening is formed in a center of the bottom wall of the lamp base body, a rear end of the opening is disposed toward the recessed portion formed in the rear wall.

10. The vehicular lamp according to claim 1, wherein mounting pieces project laterally from surfaces directing outward of the side walls, each of the mounting pieces is inclined with respect to the rear wall of the lamp base body to form a front surface in such a manner that the front surface of the mounting piece is inclined frontward as it goes downward, and a mounting hole is formed in each of the mounting pieces at a substantially center thereof.

11. The vehicular lamp according to claim 1, wherein the lens member comprises a front wall which is a flat-rectangular plate, an upper wall projecting rearward from an upper edge of the front wall, a couple of side walls projecting rearward from both side edges of the front wall, and a bottom wall projecting rearward from a lower edge of the front wall.

12. The vehicular lamp according to claim 11, wherein the front wall of the lens member comprises a flat-rectangular illuminating section formed by projecting frontward a portion of the front wall, a frontwardly opening fitting groove surrounding the illuminating section for fitting therein a gasket, and a contact surface surrounding the fitting groove.

13. The vehicular lamp according to claim 12, wherein a front surface of the illuminating section is located slightly frontward from a position of the front surface of the contact surface as viewed along the elongated direction of the lamp base body.

14. The vehicular lamp according to claim 13, wherein the illuminating section of the lens member comprises at least one of fish-eye lens steps and Fresnel lens steps on front and rear surfaces thereof.

15. The vehicular lamp according to claim 12, wherein the upper wall of the lens member comprises an upwardly directing surface in which a couple of engaging grooves and a couple of engaging-protruding pieces, the engaging grooves are disposed on positions close to both the left and right ends of the lens member and extend in front-rear direction thereof, a front end of each of the engaging grooves extends to reach the fitting groove of the front wall, the engaging-protruding pieces extend in the left-right direction along a rear edge of the upper wall and protrude upward.

16. The vehicular lamp according to claim 15, wherein each of the engaging-protruding pieces include a chamfered section at an upper-rear corner thereof.

17. The vehicular lamp according to claim 15, wherein a central portion of a rear edge of the bottom wall of the lens member defines a notch, and the integral hinge is formed on the rear edge at a center position in the left-right direction, the integral hinge being disposed frontward relative to the engaging-protruding pieces of the upper wall of the lens member.

18. The vehicular lamp according to claim 11, further comprising a mounting piece that is inclined with respect to the rear wall of the lamp base body to form a front surface that is inclined frontward as it goes downward, wherein a rear end surface of the side wall of the lens member serves as a contact surface which is inclined in such a manner that the contact surface directs frontward as it goes downward, and the contact surface surface-contacts with the front surface of the mounting piece.

19. The vehicular lamp according to claim 11, wherein at least one mounting piece projects laterally from a surface directing outward from one of the side walls of the lamp base body, the mounting piece is inclined with respect to the rear wall of the lamp base body to form a front surface such that the front surface of the mounting piece is inclined frontward as it goes downward, and a mounting hole is formed in the mounting piece at substantially a center thereof.

20. The vehicular lamp according to claim 1, wherein the integral hinge comprises a V-shaped groove at an upper surface thereof in such a manner that a thickness of the integral hinge is thinner than a thickness of the lamp base body and the lens member.

* * * * *